(12) United States Patent
Takayama et al.

(10) Patent No.: US 9,019,518 B2
(45) Date of Patent: Apr. 28, 2015

(54) IMAGE FORMING APPARATUS GENERATING OVERWRITING IMAGE DATA

(71) Applicant: Canon Kabushiki Kaisha, Tokyo (JP)

(72) Inventors: Yuuji Takayama, Yokohama (JP); Tomoyuki Saiki, Suntou-gun (JP); Go Araki, Suntou-gun (JP); Hikaru Uchidate, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/888,503

(22) Filed: May 7, 2013

(65) Prior Publication Data
US 2013/0293913 A1 Nov. 7, 2013

(30) Foreign Application Priority Data
May 7, 2012 (JP) .................................. 2012-106112

(51) Int. Cl.
*G06F 3/12* (2006.01)
*H04N 1/40* (2006.01)
*H04N 1/00* (2006.01)
*H04N 1/32* (2006.01)
*H04N 1/387* (2006.01)

(52) U.S. Cl.
CPC ............. *H04N 1/40* (2013.01); *H04N 1/00005* (2013.01); *H04N 1/00034* (2013.01); *H04N 1/0005* (2013.01); *H04N 1/00084* (2013.01); *H04N 1/387* (2013.01); *H04N 1/00063* (2013.01); *H04N 1/00068* (2013.01); *H04N 1/00578* (2013.01); *H04N 1/0058* (2013.01); *H04N 1/00612* (2013.01); *H04N 1/00655* (2013.01); *H04N 1/32133* (2013.01); *H04N 2201/044* (2013.01); *H04N 2201/3269* (2013.01); *H04N 2201/3278* (2013.01); *H04N 2201/0091* (2013.01); *H04N 2201/3226* (2013.01)

(58) Field of Classification Search
USPC ........................................................ 358/1.13
See application file for complete search history.

(56) References Cited

U.S. PATENT DOCUMENTS

| 5,666,191 | A  | * | 9/1997  | Hasegawa et al. ............ 399/366 |
| 8,208,172 | B2 |   | 6/2012  | Takayama et al. |
| 2005/0002053 | A1 | * | 1/2005  | Meador et al. ............... 358/1.14 |
| 2008/0266617 | A1 | * | 10/2008 | Suzuki .......................... 358/474 |
| 2011/0299861 | A1 |   | 12/2011 | Ogawa et al. |

FOREIGN PATENT DOCUMENTS

| JP | 10-129071 A | 5/1998 |
| JP | 2006-232467 A | 9/2006 |

OTHER PUBLICATIONS

U.S. Appl. No. 13/871,512, filed Apr. 26, 2013 to Uchidate.
U.S. Appl. No. 13/888,494, filed May 7, 2013 to Uchidate et al.

* cited by examiner

*Primary Examiner* — Jeremiah Bryar
(74) *Attorney, Agent, or Firm* — Fitzpatrick, Cella, Harper & Scinto

(57) ABSTRACT

An image forming apparatus including: a conveyance path through which a recording material is conveyed to form an image on the recording material; a reading unit that reads a document conveyed to the conveyance path; and a control unit that controls an image forming unit to overwrite a document image with an image according to a result of the reading in which the document image on the document, which is conveyed to the conveyance path, is read by reading unit.

17 Claims, 17 Drawing Sheets

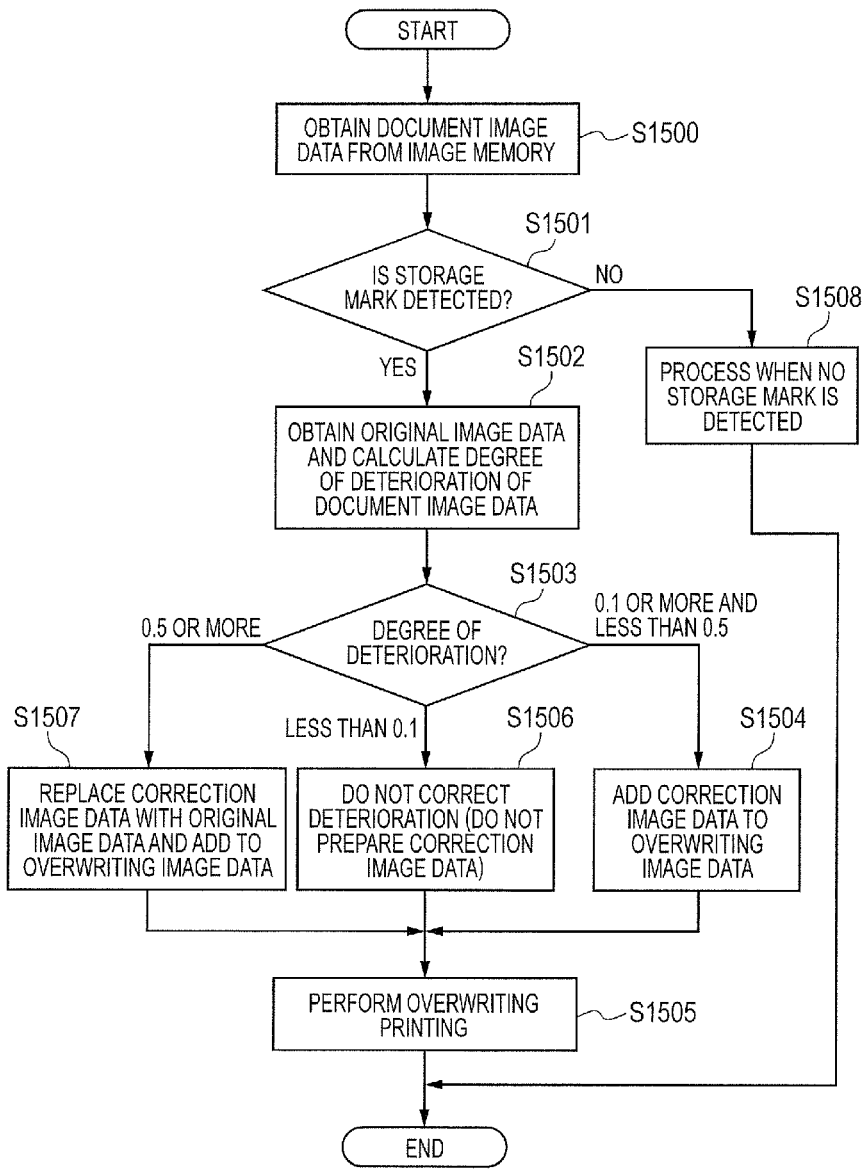

IMAGE FORMING APPARATUS GENERATING OVERWRITING IMAGE DATA

BACKGROUND OF THE INVENTION

1. Field of the Invention

The present invention relates to a document reading apparatus typified by an automatic document feeder unit (ADF) or to an image forming apparatus including the ADF such as a copier or a laser beam printer.

2. Description of the Related Art

Conventionally, in such an image forming apparatus, a document conveyance path to a document reading unit of a document conveyance type and a recording material conveyance path in an image forming unit for a recording material are independent of each other. Specifically, for each of the document and the recording material, a paper feed unit, a guide member that constitutes a predetermined conveyance path, a plurality of conveyance rollers, a motor that drives the conveyance rollers, a paper discharge unit, or the like are independently provided. Thus, increases complexity of an entire mechanism of the image forming apparatus, cost, and a size of the apparatus. Therefore, for example, Japanese Patent Application Laid-Open No. 2006-232467 proposes that a document reading unit is provided in a duplex conveyance path of a recording material, and a document conveyance path and a recording material conveyance path are shared and used to simplify a conveyance mechanism and reduce cost and size thereof.

For example, Japanese Patent Application Laid-Open No. H10-129071 discloses a technique of reading an image printed on a document, preparing an overwriting image based on the image, and performing overwriting printing on the read document. A document conveyance path and a recording material conveyance path are shared and used to allow a document after reading to be used as it is as a recording material, thereby facilitating overwriting printing.

However, when the overwriting printing is performed, the conventional configuration does not consider a measure for a case where an image on a document to be read is deteriorated, and thus overwriting printing is performed with lines or letters in the document being hard to read. Reading and overwriting printing of a deteriorated image are repeated to cause more severe deterioration of the image, thereby providing a final print hard to recognize.

The present invention is achieved in view of such circumstances, and allows printing of an overwritten final print easy to recognize even when a read document is deteriorated.

SUMMARY OF THE INVENTION

To solve the above object, the present invention provides an image forming apparatus including: a reading unit provided in the image forming apparatus, and configured to read a document image on a document conveyed in the image forming apparatus; a detection unit configured to detect deterioration of the document image read by the reading unit; a first image generation unit configured to generate a correction image for correcting a pixel in the document image in which the deterioration is detected by the detection unit; a second image generation unit configured to generate an image for overwriting the document; and a control unit configured to control the first and second image generation units that perform image formation, and the control unit configured to overwrite the document with an image obtained by adding the correction image generated by the first image generation unit to the overwriting image generated by the second image generation unit.

The present invention provides another image forming apparatus including: an image forming unit configured to form an image on a recording material; a conveyance path through which the recording material is conveyed to form an image on the recording material; a reading unit configured to read a document conveyed to the conveyance path; and a control unit configured to control the image forming unit to overwrite a document image with an image according to a result of the reading in which the document image on the document, which is conveyed to the conveyance path, is read by reading unit.

Further features of the present invention will become apparent from the following description of exemplary embodiments with reference to the attached drawings.

BRIEF DESCRIPTION OF THE DRAWINGS

FIG. 7 is a flowchart of process sequences of detection and correction of deterioration of read document image data in Embodiment 1.

DESCRIPTION OF THE EMBODIMENTS

Preferred embodiments of the present invention will now be described in detail in accordance with the accompanying drawings.

Now, embodiments of the present invention will be described with reference to the drawings.

Embodiment 1

Image Forming Process by Image Forming Apparatus

Figure 1A:
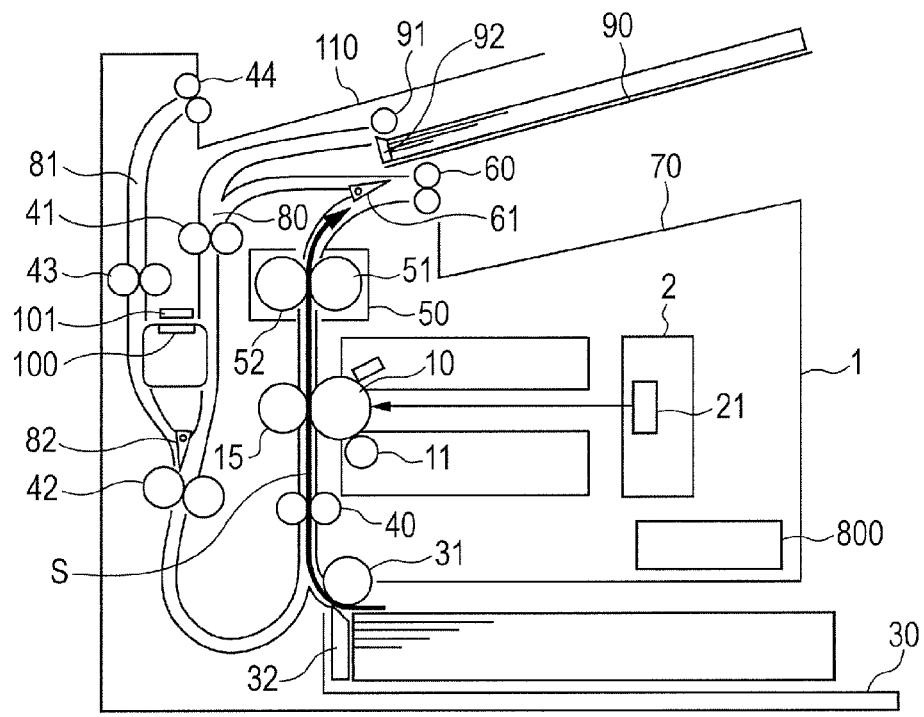
FIGS. 1A and 1B are sectional views of a configuration of an image forming apparatus according to Embodiment 1 for illustrating a duplex printing process.

First, an image forming process will be described. FIG. 1A is a sectional view of an image forming apparatus of this embodiment. In FIG. 1A, in a middle of an image forming apparatus 1, a rotatable photosensitive drum 10 that is an image bearing member, and a development roller 11 that is provided in contact with and in parallel with the photosensitive drum 10 and rotates while holding toner are placed. When an image forming instruction is received, a light emitting unit 21 provided in an optical unit 2 applies a laser light to a surface of the rotating photosensitive drum 10. On the surface of the photosensitive drum 10 to which the laser light is applied, a latent image of charges is formed. When development is performed by attaching toner held by the development roller 11 to the latent image on the surface of the photosensitive drum 10, a toner image is formed on the surface of the photosensitive drum 10.

A first paper feed unit 30 contains recording materials S that are conveyed in a conveyance path for image forming as a first conveyance path configured between a conveyance roller 40 and a paper discharge roller 60, and images are formed on the recording materials. When an image forming instruction is received, the recording materials S are conveyed one by one to the conveyance roller 40 by a cassette (hereinafter referred to as "CST") pickup roller 31, and a separation member 32. The conveyance roller 40 conveys the recording material S to a transfer roller 15 at adjusted conveyance timing so that the toner image on the photosensitive drum 10 is transferred to a predetermined position on the recording material S.

The toner image on the photosensitive drum 10 is transferred to the recording material S by a transfer bias and pressure applied to the transfer roller 15, and the recording material S is conveyed to a fixing unit 50. The fixing unit 50 fixes the toner image on the recording material S by heat of a heating roller 51 and pressure of a pressurizing roller 52 facing the heating roller 51. The recording material S on which the toner image is fixed is conveyed to the paper discharge roller 60.

Figure 1B:
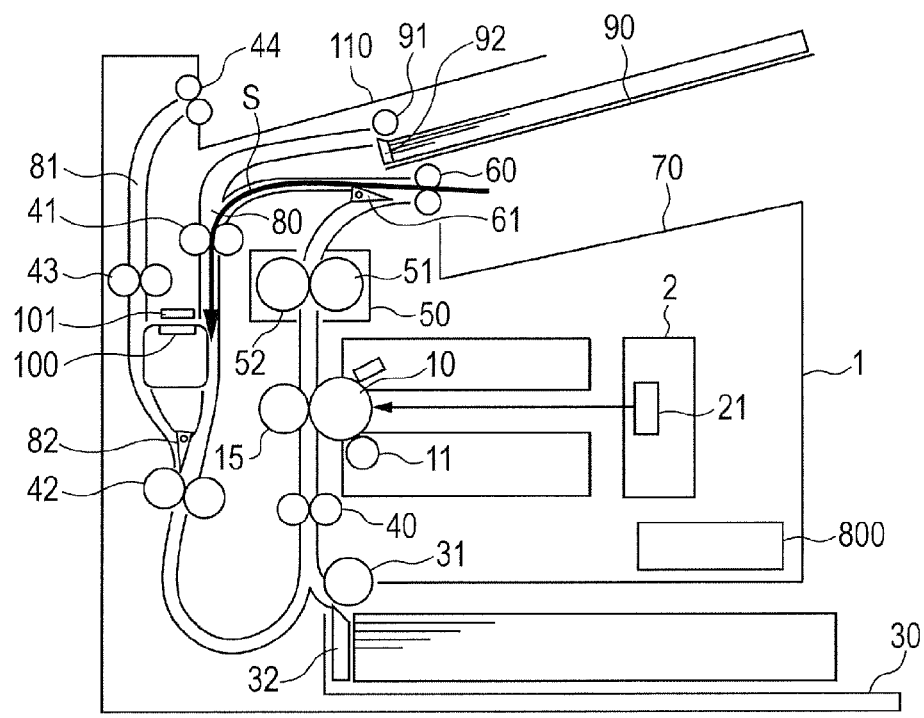

For one-side printing, the paper discharge roller 60 conveys the recording material S as it is to an outside of the apparatus, and the recording material S is stacked on a first paper discharge unit 70. For duplex printing, the paper discharge roller 60 transfers the recording material S until a trailing end in a conveyance direction of the recording material S passes through a duplex flapper 61. When it is detected that the recording material S has passed through the duplex flapper 61, the duplex flapper 61 switches a destination of the recording material S to a common conveyance path 80 that is a second conveyance path through which the recording material S and a document G are both conveyed. Then, the paper discharge roller 60 is reversed to convey the recording material S to the common conveyance path 80. As shown in FIG. 1B, the switched-back recording material S is conveyed to a document reading unit 100 by a conveyance roller 41. Further, the recording material S is conveyed again to the transfer roller 15 by conveyance rollers 42 and 40, a toner image is transferred to the other side of the recording material S and fixed on the recording material S by the fixing unit 50, and then the recording material S is stacked on the first paper discharge unit 70 by the paper discharge roller 60.

Figure 2A:
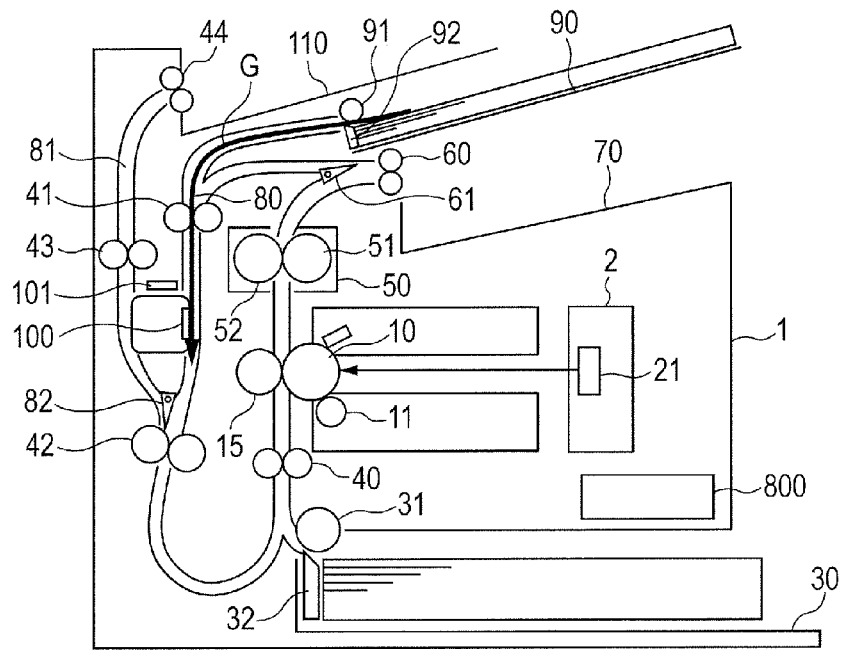
FIGS. 2A and 2B illustrate operations of duplex reading of a document and duplex printing of a recording material in Embodiment 1.

Operations of Duplex Reading of Document and Duplex Printing of Recording Material Next, processes of reading of an image on the document and duplex printing on the recording material will be described. FIG. 2A illustrates a state at a start of reading of a surface of the document G. Documents G contained in a second paper feed unit 90 provided upstream in a conveyance direction of the common conveyance path 80 are conveyed one by one to the conveyance roller 41 by a document pickup roller 91 and a separation member 92. A mechanism (not shown) that corrects rotation of the conveyed document G is provided to allow correction of rotation of the document G. Before a document reading unit 100 provided in the image forming apparatus starts reading a first surface that is a front surface of the document G conveyed from the second paper feed unit 90, the document reading unit 100 emits a light to a white reference member 101 and corrects a white reference value. Then, the document reading unit 100 rotates to a position to face the common conveyance path 80. The conveyance roller 41 conveys the document G to the document reading unit 100. The document reading unit 100 has been already in the position to face the common conveyance path 80, and reads an image on the document G when detecting a leading end in the conveyance direction of the document G. The image read by the document reading unit 100 is stored in an image memory 804 described later as document image data on the first surface of the document.

Figure 2B:
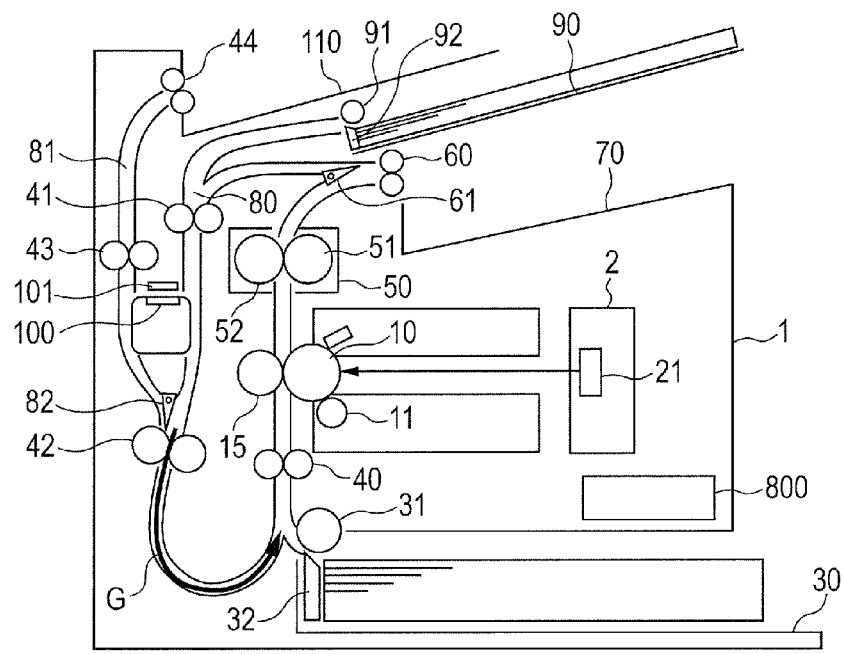

FIG. 2B illustrates a state when reading of the first surface that is the front surface of the document G is finished. The document G having passed through the document reading unit 100 is conveyed to the conveyance roller 42. The conveyance roller 42 stops when a trailing end of the document G has passed through a switchback flapper 82, and the document G stops while being nipped by the conveyance roller 42.

Figure 2C:
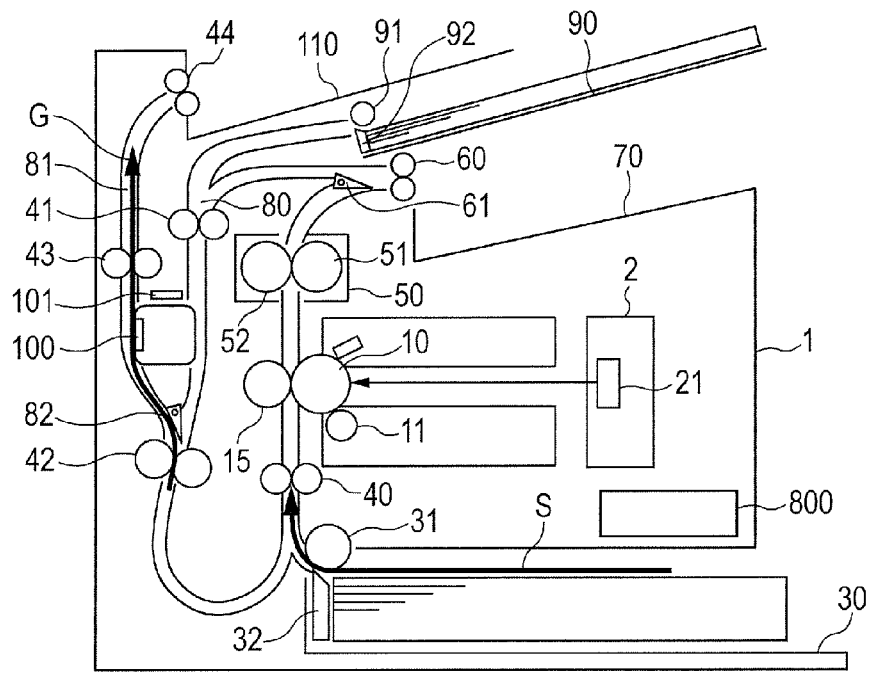
FIGS. 2C and 2D illustrate operations of duplex reading of a document and duplex printing of a recording material in Embodiment 1.

FIG. 2C illustrates a state at a start of reading of a second surface that is a back surface of the document G. The switchback flapper 82 switches the conveyance path of the document G from the common conveyance path 80 to a document-specific conveyance path 81 that is a third conveyance path, and then the document reading unit 100 rotates to a position to face the document-specific conveyance path 81. The conveyance roller 42 is reversed, and the document G is conveyed along the document-specific conveyance path 81 to the document reading unit 100. When detecting the leading end in the conveyance direction of the document G, the document reading unit 100 reads an image on the second surface that is the back surface of the document G, and stores the image as document image data on the second surface of the document in the image memory 804. When reading of the back surface of the document G is not performed, the document G is conveyed through the document-specific conveyance path 81 by the conveyance rollers 43 and 44 and stacked on a second paper discharge unit 110.

The recording materials S fed from the first paper feed unit 30 are conveyed one by one to the conveyance roller 40. Substantially at the same time, a latent image based on the document image data on the second surface that is the back surface of the document G stored in the image memory 804 is formed on the photosensitive drum 10 by the laser light from the light emitting unit 21 to the photosensitive drum 10. Then, a toner image formed by the transfer roller 15 developing the latent image is transferred to the recording material S, then the recording material S is conveyed to the fixing unit 50, and image formation on the second surface of the document G is completed. In FIG. 2C, feeding of the recording material S is started at the same time as the start of reading of the image on the second surface that is the back surface of the document G, but feeding of the recording material may be started after the image on the second surface of the document G is read.

Figure 2D:
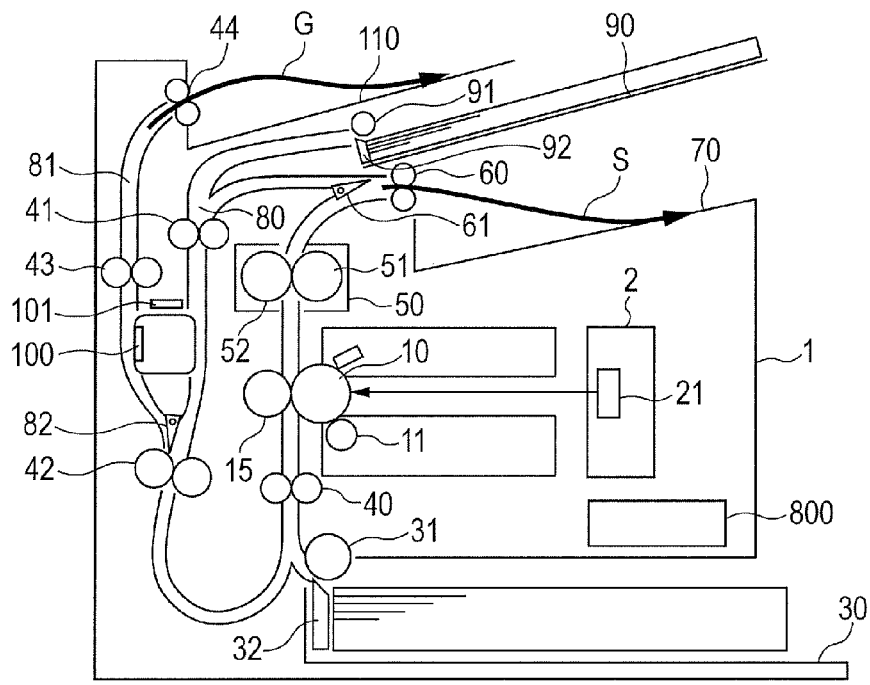

FIG. 2D illustrates a state at a finish of reading of the back surface of the document G. When the document reading is finished, the document G is conveyed by the conveyance rollers 43 and 44 and stacked on the second paper discharge unit 110. When the trailing end of the document G passes through the switchback flapper 82, the switchback flapper 82 switches the conveyance path from the document-specific conveyance path 81 to the common conveyance path 80 so that the recording material S conveyed through the common conveyance path 80 is conveyed toward the conveyance roller 40. The recording material S on which the image formation on the second surface of the document is finished is conveyed to the common conveyance path 80 switched by the duplex flapper 61, by reverse rotation of the paper discharge roller 60 provided downstream in the conveyance direction of the conveyance path of the recording material S.

Figure 2E:
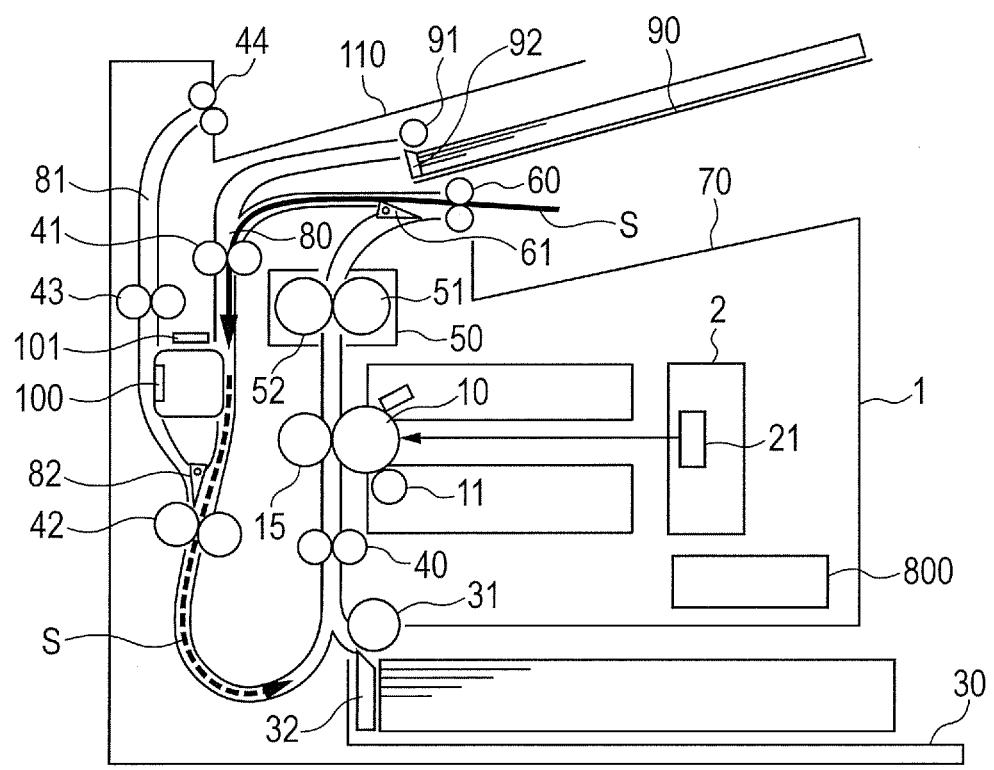
FIG. 2E illustrates operations of duplex reading of a document and duplex printing of a recording material in Embodiment 1.

FIG. 2E illustrates a state where the recording material S is conveyed to an image forming unit for forming an image on the first surface of the document G. The recording material S conveyed to the common conveyance path 80 passes through the document reading unit 100 with a sensor unit facing the document-specific conveyance path 81, is conveyed to the conveyance roller 40 by the conveyance roller 42, and again conveyed to the transfer roller 15 like the recording material S indicated by the broken line. On the recording material S on which the image formation on the second surface of the document G has been finished, a toner image is formed based on the document image data of the first surface of the document G stored in the image memory 804, and the recording material S is stacked on the first paper discharge unit 70.

Outline of Control Unit of Image Forming Apparatus

Figure 3:
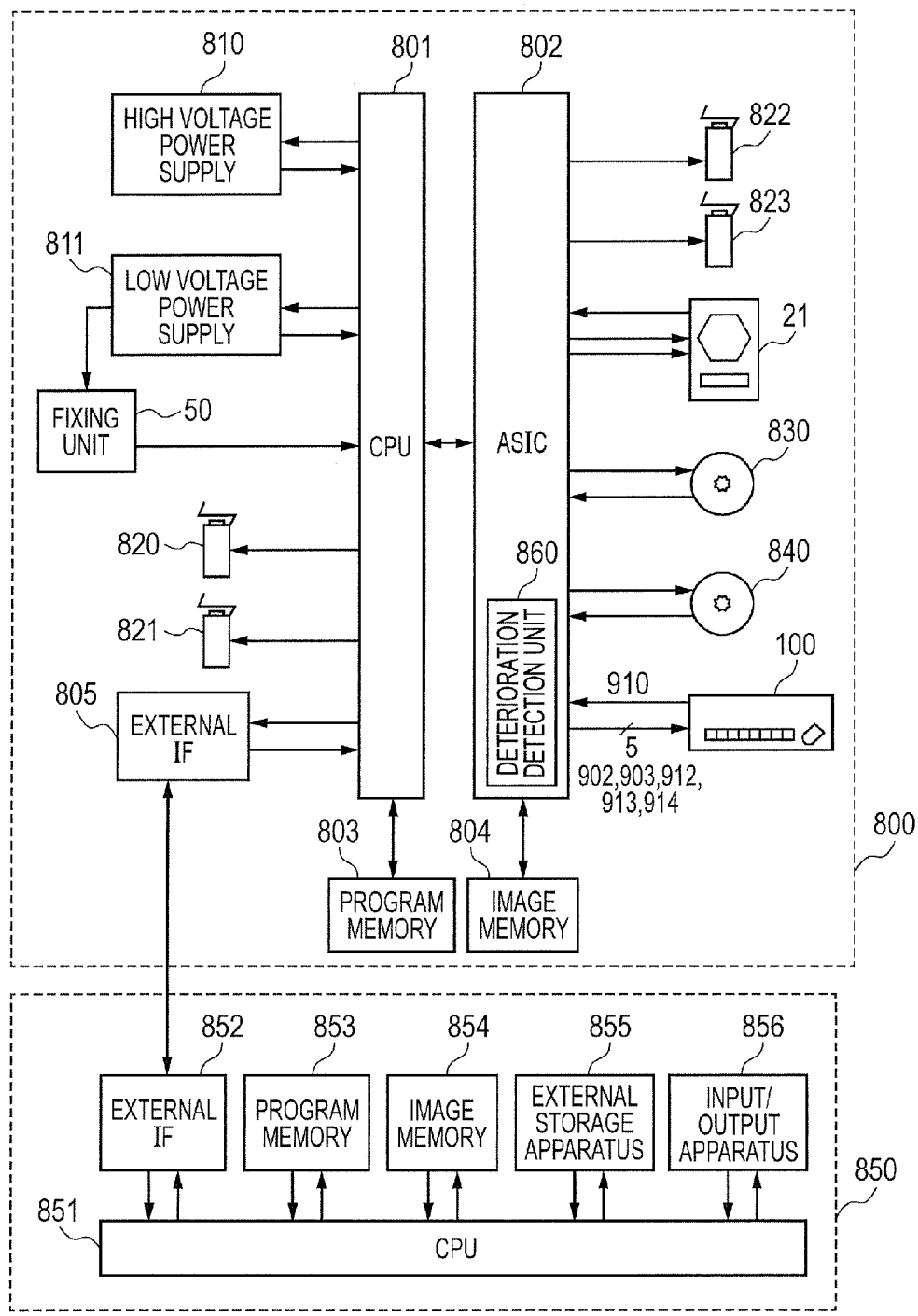
FIG. 3 is a block diagram of configurations of a control unit and a host computer in Embodiments 1, 2 and 3.

FIG. 3 is a block diagram of configurations of a control unit 800 including a CPU 801 that controls the image forming apparatus 1, and a host computer 850. In FIG. 3, the light emitting unit 21 including a rotary polygon mirror, a motor, and a laser light emitting element is connected to an ASIC (Application Specific Integrated Circuit) 802. The CPU 801 outputs a control signal to the ASIC 802 and controls the light emitting unit 21 provided in the optical unit 2 in order to draw a desired latent image on the photosensitive drum 10 by scanning with a laser light. A main motor 830 drives the CST pickup roller 31, the conveyance roller 40, the photosensitive drum 10, the transfer roller 15, the heating roller 51, and the pressurizing roller 52 to convey the recording material S. A duplex drive motor 840 is turned on at a start of driving of a paper feed roller that feeds the recording material S, and drives a CST paper feed solenoid 822 that drives the CST pickup roller 31, a document pickup roller 91, and the conveyance rollers 41 to 44. The CPU 801 controls drive systems such as the main motor 830 and the duplex drive motor 840 via the ASIC 802. The ASIC 802 includes a deterioration detection unit 860 that detects deterioration of the read document held in the image memory 804, and generates a correction pixel.

The CPU 801 controls a high voltage power supply 810, a low voltage power supply 811, and the fixing unit 50 that control a charging bias, a development bias, and a transfer bias required for an electrophotographic process. Further, the CPU 801 detects a temperature by an unshown thermistor provided in the fixing unit 50, and controls to maintain a constant temperature of the fixing unit 50.

A program memory 803 is connected to the CPU 801 via an unshown bus. The program memory 803 stores a program and data for executing processes by the CPU 801, and the CPU 801 controls an operation of the image forming apparatus 1 based on the program and data stored in the program memory 803.

The ASIC 802 controls a speed of the motor in the light emitting unit 21 and speeds of the main motor 830 and the duplex drive motor 840 based on an instruction from the CPU 801. The ASIC 802 detects tach signals (pulse signals output from the motor for each rotation of the motor) output from an unshown motor, outputs an acceleration or deceleration signal to the motor so that an output interval of the tach signals becomes a predetermined time, and controls the speed of the motor. Controlling the motor using a hardware circuit such as the ASIC 802 can reduce control load on the CPU 801.

In the host computer 850, a CPU 851 performs various controls based on an application program or a printer driver stored in the program memory 853, and operates according to a user's instruction via an input/output apparatus 856. The host computer 850 communicates with the CPU 801 via an external IF (interface) 852 and an external IF 805 of the control unit 800. The host computer 850 receives a document reading image from the CPU 801, and stores the document reading image in an image memory 854 and an external storage apparatus 855. The host computer 850 stores overwriting image data prepared by the user with reference to the document reading image in the image memory 854 or the external storage apparatus 855.

Next, a control operation of the control unit 800 during printing on the recording material will be described. When the user provides a print instruction, the host computer 850 transmits a print command or image data to the CPU 801. When receiving a print command to instruct to print on the recording material from the host computer 850, the CPU 801 drives the main motor 830, the duplex drive motor 840, and a CST paper feed solenoid 822 via the ASIC 802 to convey the recording material S. The toner image formed on the photosensitive drum 10 is transferred to the recording material S by the transfer roller 15, and then fixed on the recording material by the fixing unit 50, and the recording material S is discharged by the paper discharge roller 60 to the first paper discharge unit 70 as a recording material stacking unit. To increase alignment performance of the recording material, the first paper discharge unit 70 has a gentle upward gradient in a recording material discharge direction from near a paper discharge port. The CPU 801 supplies predetermined electric power from a low voltage power supply 811 to the fixing unit 50 and causes the fixing unit 50 to generate a desired amount of heat to heat the recording material S, thereby fusing and fixing the toner image on the recording material S.

Next, a control operation of the control unit 800 during document reading will be described. When receiving a scan command to instruct to read the document G from the host computer 850, the CPU 801 drives a duplex flapper solenoid 820 and the duplex drive motor 840 via the ASIC 802 and operates a document paper feed solenoid 823. Thus, torque of the duplex drive motor 840 is transmitted to the document pickup roller 91 to convey the document G. The document reading unit 100 reads the document G based on a CISSTART signal 902, a CISLED signal 903, an Sl_in signal 912, an Sl_select signal 913, and a SYSCLK signal 914 that are control signals from the ASIC 802. These control signals will be described later in detail. The CPU 801 stores read document image data output from the document reading unit 100 as an Sl_out signal 910 in the image memory 804 connected to the ASIC 802, by control via the ASIC 802. Further, the CPU 801 transmits the read document image data via the external IF 805 to the host computer 850. Then, the CPU 801 operates the switchback solenoid 821 to tilt the switchback flapper 82 toward the document-specific conveyance path 81, reverses the duplex drive motor 840, and conveys the document G to the second paper discharge unit 110.

Outline of Document Reading Unit

Figure 4:
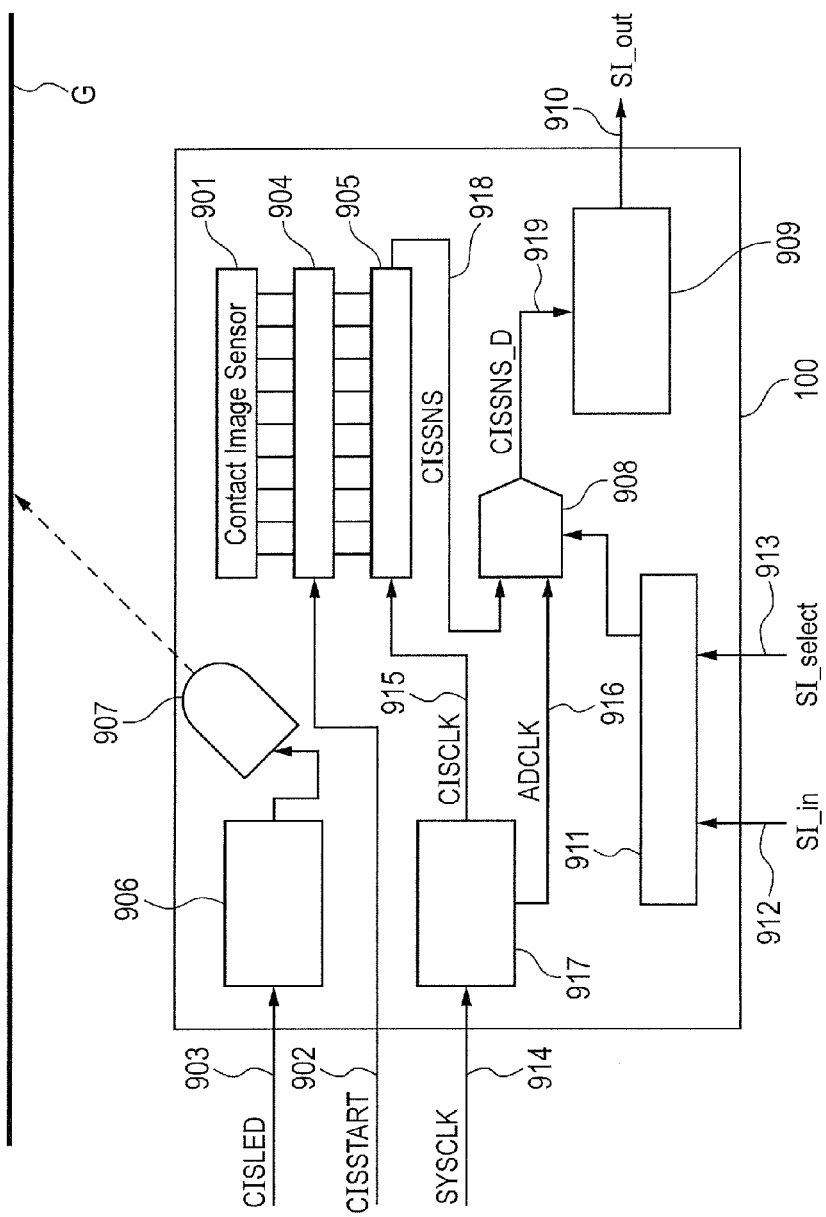
FIG. 4 is a block diagram of a circuit configuration of a document reading unit in Embodiments 1, 2 and 3.

Next, with reference to FIG. 4, details of the document reading unit 100 will be described. FIG. 4 is a block diagram of a circuit configuration of the document reading unit 100. In FIG. 4, a CIS (Contact Image Sensor) sensor unit 901 is a contact image sensor portion, and for example, photodiodes for 10368 pixels are arranged in an array with a specific main scan density (for example, 1200 dpi). The CISSTART signal 902 is a document reading start pulse signal input to the CIS sensor, and the CISLED signal 903 is a control signal that controls a light emitting element 907. A current amplification unit 906 controls a current to be supplied to the light emitting element 907 based on the CISLED signal 903, and the light emitting element 907 uniformly applies a light to the document G. A timing generator 917 inputs a SYSCLK signal 914 and generates an ADCLK signal 916 and a CISCLK signal 915. The SYSCLK signal 914 is a system clock that determines an operation speed of the document reading unit 100, and the ADCLK signal 916 is a sampling clock that determines a sampling speed of an A/D converter 908. The CISCLK signal 915 is used as a transfer clock of a CISSNS signal 918 that is an output signal of a shift resister 905.

Next, a document reading operation will be described. When the CISSTART signal 902 becomes active, the CIS sensor unit 901 starts to accumulate charges based on the light applied by the light emitting element 907, reflected by the document G and received by the CIS sensor unit 901, and successively sets charge data accumulated in an output buffer 904. The timing generator 917 outputs the CISCLK signal 915 having, for example, a clock frequency of about 500 kHz to 1 MHz to the shift resister 905. The shift resister 905 outputs the charge data set in the output buffer 904 to the A/D converter 908 as a CISSNS signal 918 in synchronization with the input CISCLK signal 915. The CISSNS signal 918 has a predetermined data assurance area, and the A/D converter 908 needs to sample the CISSNS signal 918 after a lapse of a predetermined time from rise timing of the CISCLK signal 915 that is a transfer clock. The CISSNS signal 918 is output from the shift resister 905 in synchronization with both of a rising edge and a trailing edge of the CISCLK signal 915 that is the transfer clock. Thus, the ADCLK signal 916 that is the clock for sampling the CISSNS signal 918 is generated by the timing generator 917 so as to have a frequency twice that of the CISCLK signal 915. The CISSNS signal 918 is sampled at a rising edge of the ADCLK signal 916. The timing generator 917 divides the SYSCLK signal 914 that is an input system clock to generate the ADCLK signal 916 and the CISCLK signal 915 that is the transfer clock. A phase of the ADCLK signal 916 is delayed by the data assurance area as compared to the CISCLK signal 915 that is the transfer clock.

The CISSNS signal 918 is digital converted by the A/D converter 908, and output as a CISSNS_D signal 919 to an output interface circuit 909. The output interface circuit 909 outputs the CISSNS_D signal 919 as an Sl_out signal 910 of serial data at predetermined timing. At this time, an analogue output reference voltage is output to the CISSNS_D signal 919 at predetermined pixels from the CISSTART signal 902 that is a start pulse, and the pixels cannot be used as effective pixels.

A control circuit 911 controls an A/D conversion gain of the A/D converter 908 via the ASIC 802 based on the Sl_in signal 912 and the Sl_select signal 913 from the CPU 801. For example, when contrast in an image on a read document is low, the CPU 801 increases the A/D conversion gain of the A/D converter 908 to increase contrast, thereby allowing the document to be always read with best contrast.

The descriptions have been made using an apparatus configuration in which image information on all pixels is output as the CISSNS_D signal 919 that is one output signal, but a configuration may be used in which the pixels are divided into areas and the plurality of areas are simultaneously A/D converted for high speed document reading. Also, the embodiment using the CIS sensor as the document reading unit 100 has been described, but the CIS sensor may be replaced by a CMOS sensor or a CCD sensor.

Overwriting Printing Process (1) One-Sided Overwriting Printing

Figure 5A:
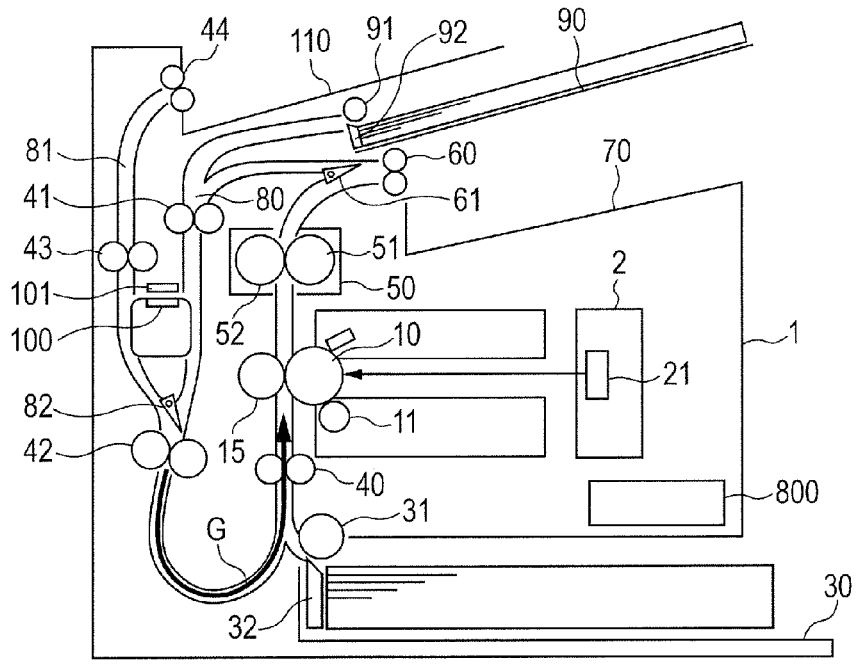
FIGS. 5A and 5B illustrate an operation of overwriting printing in Embodiments 1, 2 and 3.

Next, a process of performing overwriting printing will be described. FIG. 5A illustrates one-sided overwriting printing. As described with reference to FIGS. 2A and 2B, when the user provides an overwriting print instruction to overwrite the document G, the document reading unit 100 first reads the first surface of the document G contained in the second paper feed unit 90. When document reading is completed, the document G stops while being held by the conveyance roller 42.

When the document reading is finished and the host computer 850 transmits an overwriting print command to the CPU 801, the CPU 801 controls to convey the document G to the conveyance roller 40. The conveyance roller 40 conveys the document G to the transfer roller 15 at adjusted timing so that the toner image on the photosensitive drum 10 is transferred to a predetermined position on the document G. Thus, the document G can be used as a recording material S, and an image can be formed on the first surface of the document G by the same method as in FIG. 1A. After image formation, the document G is conveyed to the paper discharge roller 60 and stacked on the first paper discharge unit 70.

The image forming apparatus 1 includes a mechanism (not shown) that corrects rotation of the document G. Furthermore, the document reading unit 100 detects a leading end in the conveyance direction of the document G, and the optical unit 2 is controlled by using information of the leading end of the document, thereby allowing overwriting printing on the document G with high accuracy.

(2) Duplex Overwriting Printing

Figure 5B:
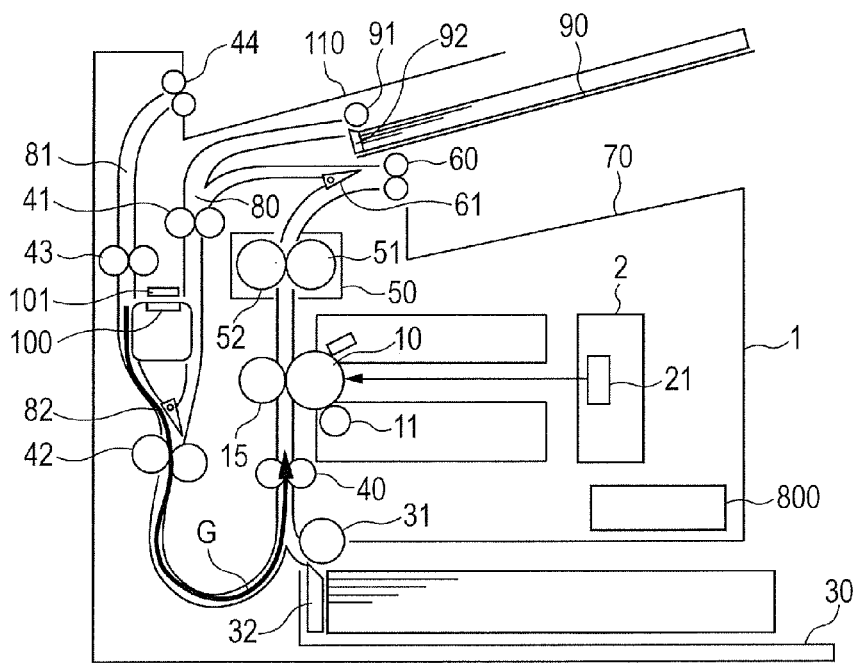

Next, a process of performing duplex overwriting printing will be described. FIG. 5B illustrates duplex overwriting printing. As described with reference to FIGS. 2A, 2B and 2C, the document reading unit 100 first reads a first surface and a second surface of the document G contained in the second paper feed unit 90, and then the document G stops while being nipped by the conveyance roller 43.

When the document reading is finished, and the host computer 850 transmits an overwriting printing command to the CPU 801, the CPU 801 controls to convey the document G to the conveyance roller 40. The conveyance roller 40 conveys the document G to the transfer roller 15 at adjusted timing so that the toner image on the photosensitive drum 10 is transferred to a predetermined position on the document G. Thus, the document G can be used as a recording material S, and an image can be formed on the first surface of the document G by the same method as in FIG. 1A. Also, an image can be formed on the second surface of the document G by the same method as in FIG. 1B. After image formation, the document G is conveyed to the paper discharge roller 60 and stacked on the first paper discharge unit 70.

When the CPU 801 receives the overwriting printing command from the host computer 850, the CPU 801 drives the duplex flapper solenoid 820 and the duplex drive motor 840 to operate the CST paper feed solenoid 822. Thus, torque of the duplex drive motor 840 is transmitted to the document pickup roller 91, and the document G is conveyed to the document reading unit 100.

The CPU 801 stores the document image data read from the document reading unit 100 via the ASIC 802 in the image memory 804 connected to the ASIC 802. At this time, in a case of the one-sided overwriting printing, the document G stops while being nipped by the conveyance roller 42. Meanwhile, in a case of the duplex overwriting printing, the document G stops while being nipped by the conveyance roller 43. The CPU 801 transmits the stored document image data via the external IF 805 to the host computer 850.

The host computer 850 prepares overwriting image data based on the document image data received from the CPU 801. Then, the host computer 850 notifies the CPU 801 of completion of formation of the overwriting image, and transmits the formed overwriting image data to the CPU 801.

When the CPU 801 is notified of the completion of formation of the overwriting image by the host computer 850, the CPU 801 drives the main motor 830 and the duplex drive motor 840 to convey the document G to the image forming unit, and form an image on the first surface using the document G as the recording material S. Then, in the case of the duplex overwriting printing, an image is also formed on the second surface of the document G.

By the above described process, the image printed on the document G is read, an overwriting image is formed based on the reading image, and overwriting printing on the document G is performed.

Process Sequence of Deterioration Correction of Document Image Data

Next, with reference to FIGS. 6 and 7, a configuration of a deterioration detection unit 860 that detects and corrects image quality deterioration of document image data based on the read document image data, and a process sequence of deterioration correction will be described below. In this embodiment, the document image data and original image data before printing of the document image data are compared for each pixel to detect image quality deterioration, and calculate a degree of deterioration depending on the number of deteriorated pixels in unit pixels (in this embodiment, 5×5 pixels).

Figure 6:
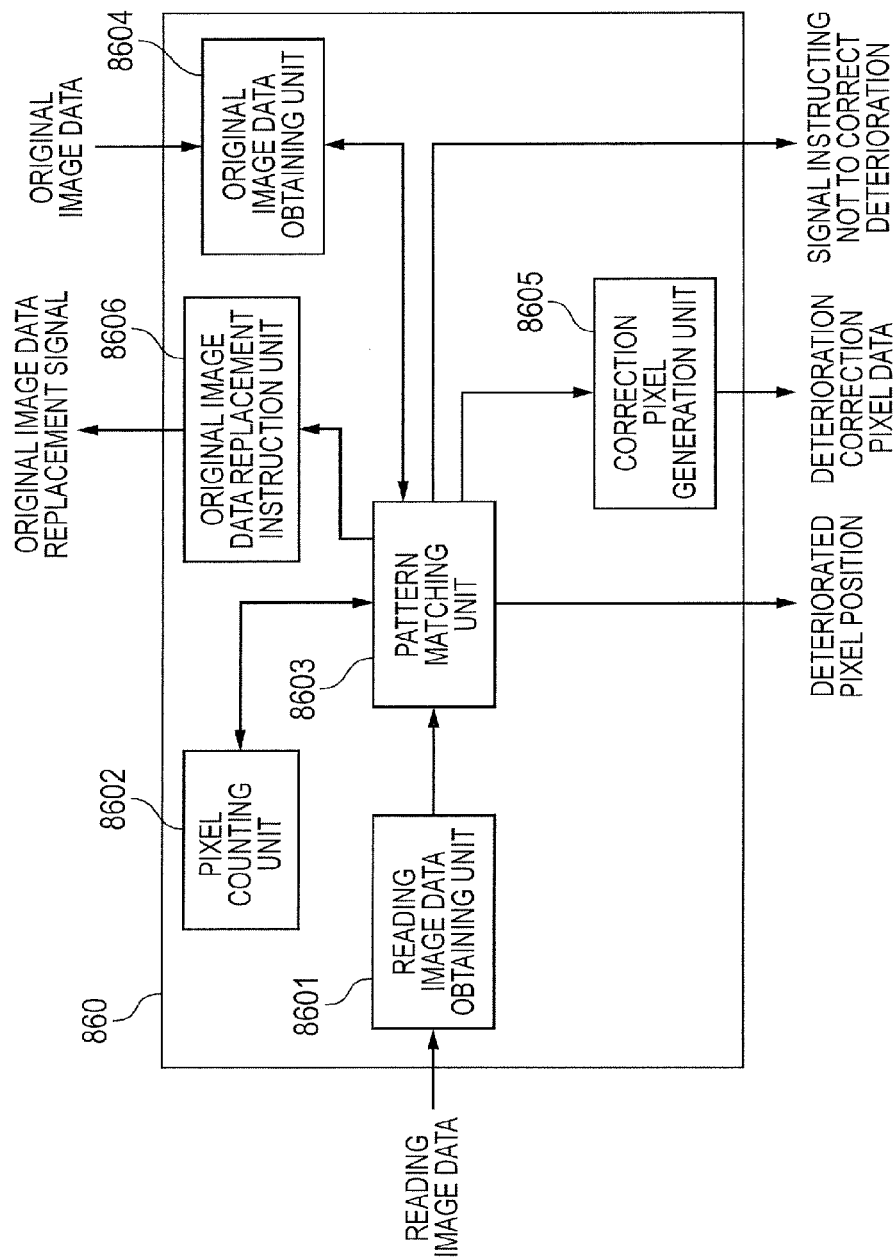
FIG. 6 is a functional block diagram of a configuration of a deterioration detection unit in Embodiments 1, 2 and 3.

FIG. 6 illustrates the configuration of the deterioration detection unit 860 with functional blocks. In FIG. 6, each box in the deterioration detection unit 860 illustrates a functional block, and an arrow between the functional blocks indicates a flow of a signal. Further, an arrow to the deterioration detection unit 860 indicates input data, and an arrow from the deterioration detection unit 860 indicates output data or an output signal. FIG. 7 is a flowchart of a process sequence of detecting and correcting deterioration of the read document image data by the deterioration detection unit 860. When the CPU 801 instructs the deterioration detection unit 860 to correct the read document image data via the ASIC 802, a process in FIG. 7 is started.

First, in Step 1500 (hereinafter referred to as S1500), an obtaining unit 8601 of the deterioration detection unit 860 obtains reading image data on a read document (hereinafter referred to as "document image data") stored in the image memory 804. The obtained document image data is output to a pattern matching unit 8603 of the deterioration detection unit 860.

Then, in S1501, the pattern matching unit 8603 performs a detecting process of mark (hereinafter referred to as a "storage mark") of input document image data, indicating a storage location of image data before printed on the document G (hereinafter referred to as "original image data"). The "original image data" refers to an original of the document image data, and electronic image data before printing. The "storage mark" refers to an image code in which information is embedded, for example, a QR Code® or a digital watermark. When the pattern matching unit 8603 cannot detect the storage mark from the input document image data, in S1508, a process when no storage mark is detected is performed. The process in S1508 will be described in detail in Embodiment 2.

Figure 8A:
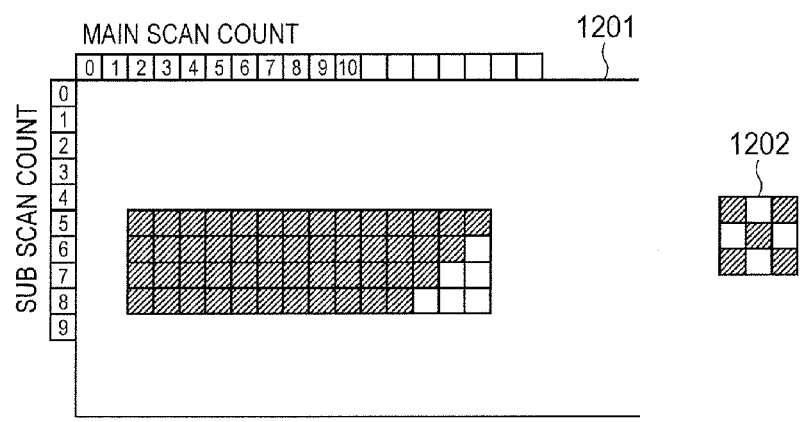
FIGS. 8A, 8B and 8C illustrate image deterioration detection and correction in Embodiment 1.

With reference to FIGS. 8A to 8J, a method of detecting the storage mark indicating the storage location of the original image data will be described. FIGS. 8A to 8J illustrate a method for correcting deteriorated document image data. Image data 1201 in FIG. 8A illustrates original image data, and image data 1202 illustrates the storage mark. In this embodiment, the storage location of the original image data 1201 indicated by the storage mark 1202 is an external storage apparatus 855 of the host computer 850.

Figure 8B:
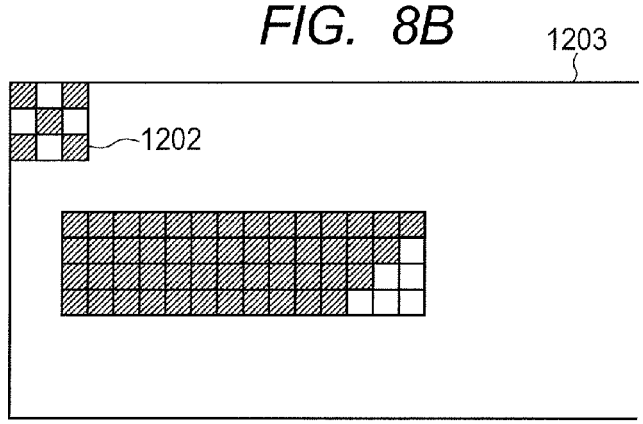
Figure 8C:
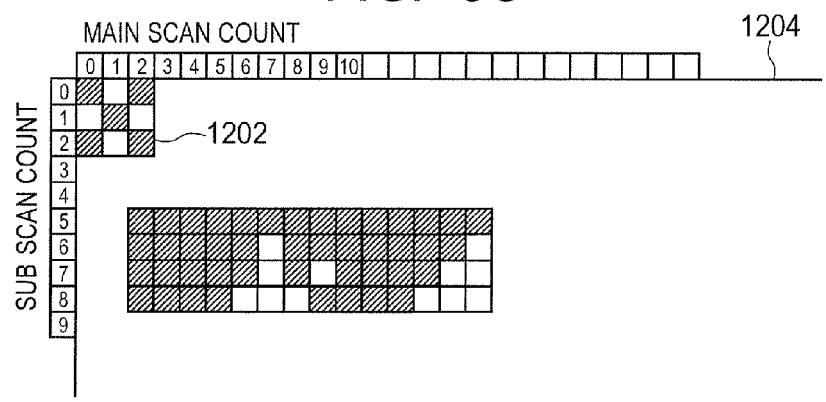

In this embodiment, the storage mark 1202 is added to the original image data 1201 to generate image data 1203 in FIG. 8B, and then the image data 1203 becomes original image data. For example, it is assumed that the original image data 1203 is printed using the image forming apparatus 1. Document image data of the printed image read by the document reading unit 100 is denoted by 1204 in FIG. 8C. In FIG. 8C, a main scan count is a number indicating a position in a main scan direction (lateral direction in FIG. 8C) of the document image data 1204, and a sub scan count is a number indicating a position in a sub scan direction (vertical direction in FIG. 8C) of the document image data 1204.

A pixel counting unit 8602 is connected to the pattern matching unit 8603 of the deterioration detection unit 860 in FIG. 6, and the pattern matching unit 8603 outputs the document image data 1204 to the pixel counting unit 8602. The pixel counting unit 8602 counts the numbers of pixels in the main scan direction and the sub scan direction of the input document image data 1204, and outputs count values to the pattern matching unit 8603.

The pattern matching unit 8603 associates the count values in the main scan direction and the sub scan direction corresponding to a pixel based on the count values output from the pixel counting unit 8602. For example, in the document image data 1204 in FIG. 8C, a most upper left pixel has a main scan count value of 0 and a sub scan count value of 0. A next pixel to the right has a main scan count value of 1 and a sub scan count value of 0.

The storage mark 1202 is formed in a specific position of the document image data 1204, and in this embodiment, formed in positions with main scan count values of 0, 1 and 2 and sub scan count values of 0, 1 and 2. Then, in S1501, the pattern matching unit 8603 uses image pattern data for detecting a storage mark including therein, and detects whether there is a storage mark in a specific position in the document image data obtained from the image memory 804. When the storage mark 1202 is detected in the specific position in the document image data 1204, the pattern matching unit 8603 proceeds to a process in S1502. When the storage mark 1202 is not detected, the pattern matching unit 8603 proceeds to a process in S1508.

In S1502, the pattern matching unit 8603 instructs the original image data obtaining unit 8604 to obtain the original image data 1201 from the storage location indicated by the storage mark 1202. The original image data obtaining unit 8604 having been instructed by the pattern matching unit 8603 obtains the original image data 1201 from the storage location indicated by the storage mark 1202. In this embodiment, the storage location indicated by the storage mark 1202 is the external storage apparatus 855 of the host computer 850. Thus, the original image data obtaining unit 8604 obtains the original image data 1201 stored in the external storage apparatus 855 via the CPU 801 and the external IF 805 of the control unit 800, and the external IF 852 of the host computer. When the original image data obtaining unit 8604 obtains the original image data 1201, the original image data obtaining unit 8604 outputs the original image data 1201 to the pattern matching unit 8603.

Further, in S1502, the pattern matching unit 8603 calculates the degree of deterioration of the document image data 1204. The "deterioration" refers to a state where a pixel having existed in the original image data 1201 disappears from or is faded in the document image data 1204. In this embodiment, when a pixel in the obtained original image data 1201 and a pixel in the document image data 1204 in the same position are similarly black or white, it is determined that the pixel is not deteriorated. On the other hand, when one pixel is white but the other pixel is black, it is determined that the pixel is deteriorated. The "degree of deterioration" is calculated by finding a rate of deteriorated pixels in a deterioration detection matrix (hereinafter also referred to as "matrix") determined by a specific number of pixels.

With the original image data 1201 and the document image data 1204, a method for detecting deterioration and a method for calculating the degree of deterioration based on a deterioration detection result will be described. In this embodiment, the storage mark 1202 is detected in the document image data 1204, and thus the original image data 1201 is used to specify a deteriorated pixel in the document image data 1204. Specifically, the original image data 1201 and the document image data 1204 are subjected to pattern matching for each pixel, thereby detecting a deteriorated pixel in the document image data 1204.

The pattern matching unit 8603 compares the pixel in the original image data 1201 obtained based on the storage mark 1202 with the pixel in the same position in the document image data 1204 read by the document reading unit 100, and determines whether the pixels are the same. For example, as a procedure of comparing the pixels, pixels in the original image data 1201 and the document image data 1204 with a main scan count value of 3 and a sub scan count value of 0 are compared. In this case, both are the same white pixels, and thus it is determined that the pixel is not deteriorated. By a similar procedure, the main scan count value is incremented by one with a constant sub scan count value of both of the original image data 1201 and the document image data 1204. Then, the pixels in the original image data 1201 and the document image data 1204 corresponding to the main scan count value and the sub scan count value are repeatedly compared up to a maximum value of the main scan count value (a total number of pixels in the main scan direction of the document image data 1204). When the main scan count value reaches the maximum value, the sub scan count value is incremented by one, the main scan count value is again incremented by one from zero, and the corresponding pixels in the corresponding original image data 1201 and the document image data 1204 are compared. When the count value in the sub scan direction reaches a maximum value (a total number of pixels in the sub scan direction of the document image data 1204), and the main scan count value reaches a maximum value, pixel comparison is finished.

For example, in this embodiment, a pixel with a main scan count value of 6 and a sub scan count value of 8 in the document image data 1204 is a deteriorated pixel (white spot pixel) as compared to a pixel in the same position in the original image data 1201. Similarly, a pixel with a main scan count value of 7 and a sub scan count value of 6, a pixel with a main scan count value of 7 and a sub scan count value of 7, and a pixel with a main scan count value of 7 and a sub scan count value of 8 are deteriorated pixels (white spot pixels). Further, a pixel with a main scan count value of 8 and a sub scan count value of 8, and a pixel with a main scan count value of 9 and a sub scan count value of 7 are deteriorated pixels (white spot pixels) as compared to the original image data 1201. Positional information on the deteriorated pixel (a deteriorated pixel position in FIG. 6) is output from the pattern matching unit 8603 via the CPU 801, the external IF 805, and the external IF 852 to the host computer 850, and stored in the external storage apparatus 855 of the host computer 850.

When the deterioration of the pixel in the document image data 1204 is detected, pixel values in the pixel position where the deterioration is detected are compared. The pixel values are compared by calculating a difference between the pixel values in the original image data 1201 and the document image data 1204 in the pixel position where the deterioration is detected. For example, in this embodiment, a pixel value of a pixel with a main scan count value of 6 and a sub scan count value of 8 in the document image data 1204 is 255 in 8-bit gradation data expressed by 8 bits in the original image data 1201, and 0 in 8-bit gradation data in the document image data 1204. Thus, the difference between the pixel values of the two image data is 255. The calculated difference value is output from the pattern matching unit 8603 to a correction pixel generation unit 8605.

In the correction pixel generation unit 8605, a correction pixel value to be pixel data used for correcting the deteriorated pixel in the document image data 1204 is generated based on the difference value output from the pattern matching unit 8603. In this embodiment, the difference value is a correction pixel value. In this embodiment, the correction pixel value is the difference value, but not limited to this, and the correction pixel value may be generated by multiplying the difference value by a gain depending on the difference value. In this embodiment, difference values of correction pixel values of deteriorated pixels other than a pixel with a main scan count value of 6 and a sub scan count value of 8 are all 255.

The correction pixel value generated by the correction pixel generation unit 8605 in FIG. 6 is output as deterioration correction pixel data via the CPU 801, the external IF 805, and the external IF 852 to the host computer 850, and stored in the external storage apparatus 855 of the host computer 850.

Next, the degree of deterioration will be described. In this embodiment, the specific number of pixels is 25 with 5 pixels in the main scan direction and 5 pixels in the sub scan direction, and a rate of the deteriorated pixels included in the matrix of the 25 pixels is the "degree of deterioration". Information on the deteriorated pixel position is used to move the matrix of the 25 pixels on the document image data 1204 and calculate the degree of deterioration.

Figure 8D:
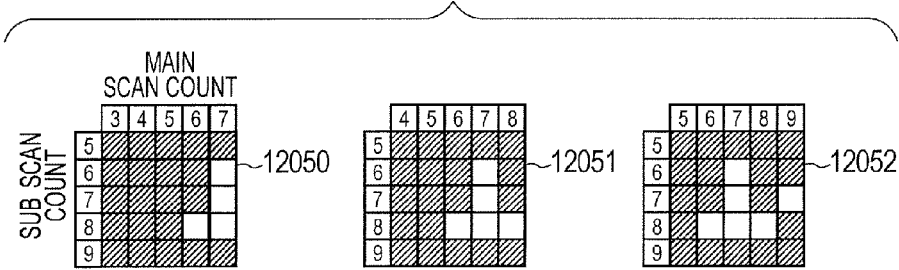
FIGS. 8D, 8E and 8F illustrate image deterioration detection and correction in Embodiment 1.
Figure 8E:
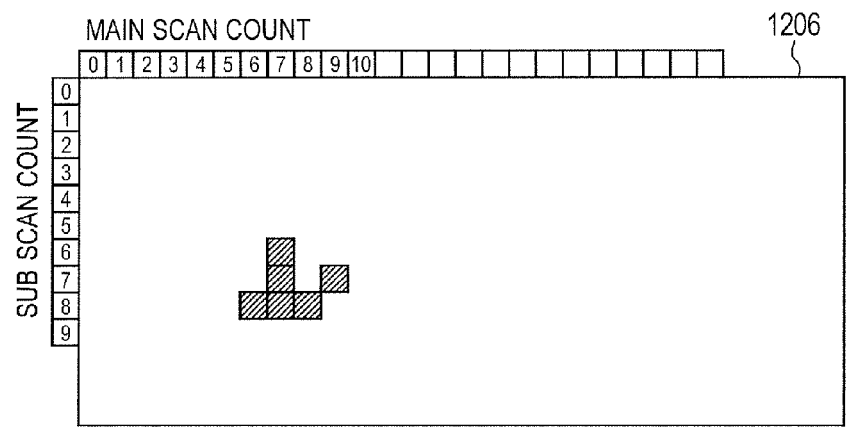

A method for calculating the degree of deterioration will be described using image data 12050, 12051, and 12052 in FIG. 8D. For example, the image data 12050 in FIG. 8D is image data when a matrix is located in a position with main scan count values of 3 to 7 and sub scan count values of 5 to 9. In this case, there are four white spot pixels that are deteriorated pixels, and thus the degree of deterioration is $4/25=0.16$. The image data 12051 in FIG. 8D is image data when the matrix proceeds by one pixel in the main scan direction from the image data 12050. In the image data 12051, there are five deteriorated pixels, and thus the degree of deterioration is $5/25=0.2$. The image data 12052 in FIG. 8D is image data when the matrix further proceeds by one pixel in the main scan direction from the image data 12051. In this case, there are six deteriorated pixels, and thus the degree of deterioration is calculated to be 6/25=0.24.

A maximum value of the degree of deterioration is the degree of deterioration of the document image data. In this embodiment, the degree of deterioration in the image data 12052 in FIG. 8D is a maximum value, and the degree of deterioration of the document image data 1204 is calculated to be 0.24.

In S1503, the pattern matching unit 8603 performs correction process based on the calculated degree of deterioration. Specifically, the pattern matching unit 8603 proceeds to S1506 when the degree of deterioration is less than 0.1 (less than a first predetermined value), and proceeds to S1504 when the degree of deterioration is 0.1 or more (the first predetermined value or more) and less than 0.5 (less than a second predetermined value). The pattern matching unit 8603 proceeds to a process in S1507 when the degree of deterioration is 0.5 or more (the second predetermined value or more).

In S1504, the pattern matching unit 8603 instructs the host computer 850 to prepare overwriting image data with correction image data being added. In the example in FIG. 8D described above, the degree of deterioration is 0.24, and this applies to the case of S1504 where the degree of deterioration is 0.1 or more and less than 0.5.

Figure 8F:
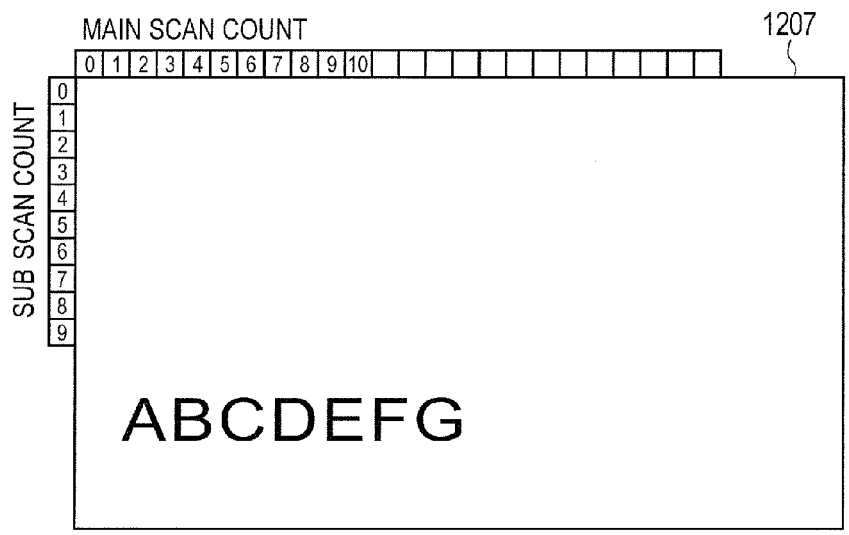
Figure 8G:
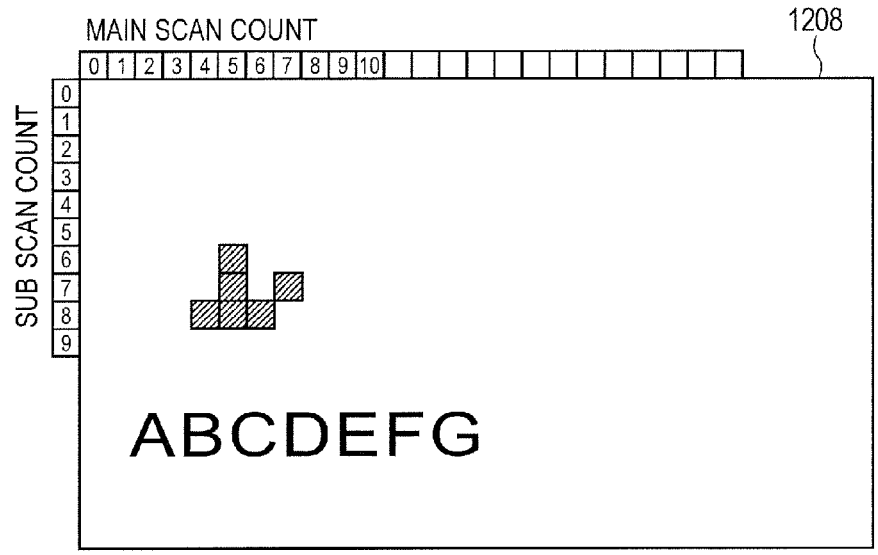
FIGS. 8G and 8H illustrate image deterioration detection and correction in Embodiment 1.

The position of the deteriorated pixel ("deteriorated pixel position" in FIG. 6) and the pixel value of the correction image ("deterioration correction pixel data" in FIG. 6) are stored in the external storage apparatus 855 of the host computer 850. Then, the host computer 850 generates the correction image data 1206 in FIG. 8E based on the position of the deteriorated pixel and the pixel value of the correction image stored in the external storage apparatus 855 (first image generation). The image data in FIG. 8F is original overwriting image data 1207, and the original overwriting image data is image data overwriting the document G prepared by the used based on the document image data 1204. The host computer 850 prepares the original overwriting image data 1207 overwriting the document based on the image prepared by the user with reference to the document reading image (second image generation), and stores the original overwriting image data 1207 in the image memory 854 or the external storage apparatus 855. The host computer 850 adds the correction image data 1206 to the original overwriting image data 1207 to prepare overwriting image data 1208 in FIG. 8G, and the host computer 850 notifies the pattern matching unit 8603 of completion of preparation of the overwriting image data.

Figure 8H:
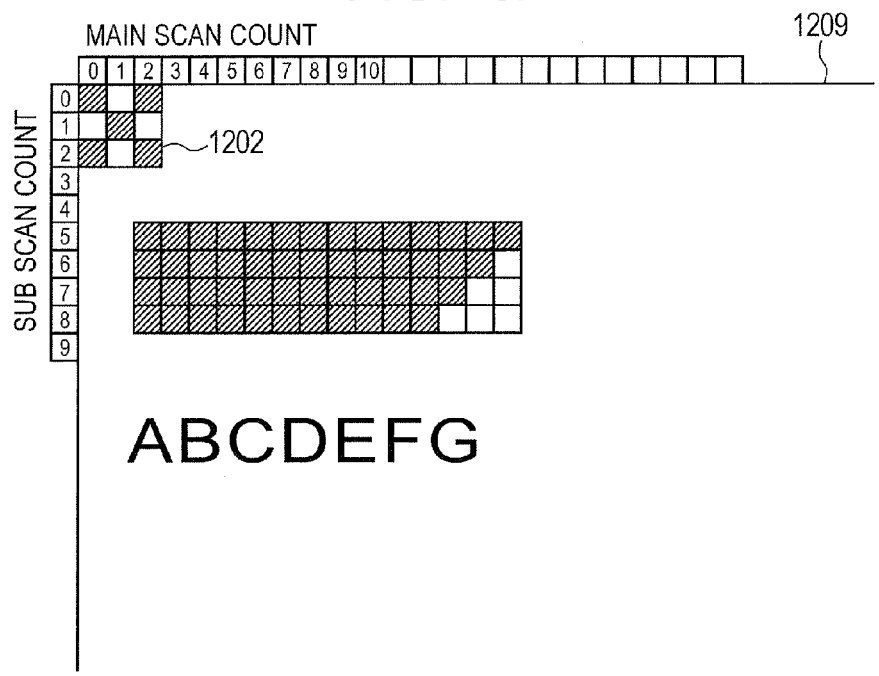
Figure 8I:
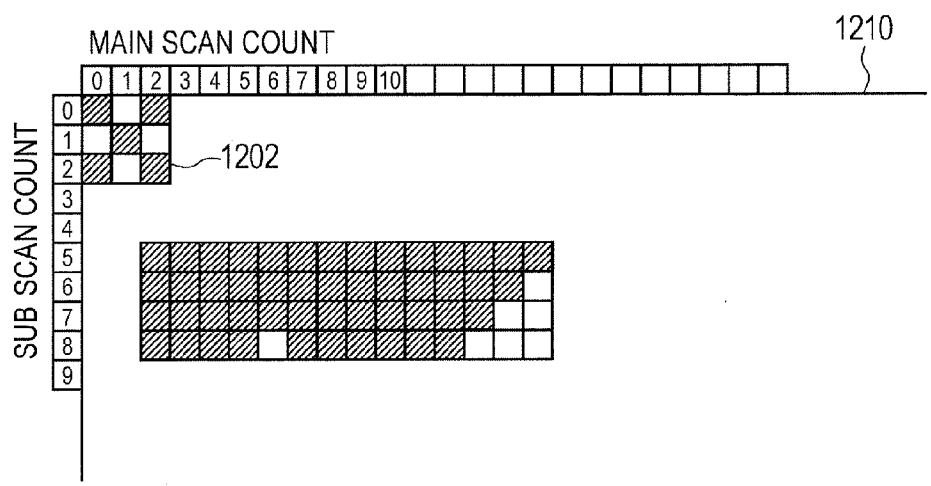
FIGS. 8I and 8J illustrate image deterioration detection and correction in Embodiment 1.
Figure 8J:
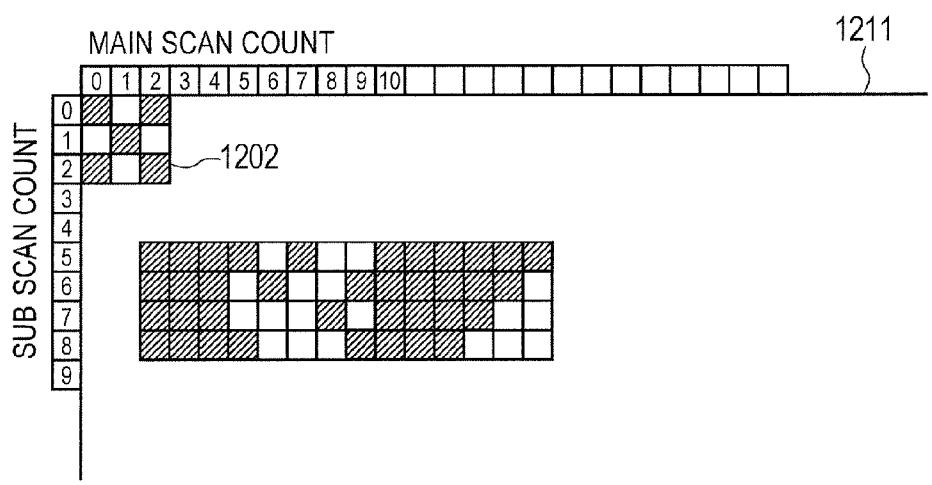

Next, in S1505, the pattern matching unit 8603 instructs the CPU 801 to perform overwriting printing, and overwriting printing is performed to overwrite the document G with the overwriting image data 1208. Specifically, the CPU 801 instructed to perform overwriting printing instructs the host computer 850 to prepare an overwriting image, and the host computer 850 notifies the CPU 801 of completion of preparation of the overwriting image, and transmits the prepared overwriting image data 1208. When the CPU 801 is notified of the completion of preparation of the overwriting image by the host computer 850, the CPU 801 conveys the document G to the image forming unit, and performs overwriting printing of the overwriting image data 1208 received from the host computer 850 on the document G. After the overwriting printing is finished, an image 1209 shown in FIG. 8H is formed on the document G.

In S1506 that is a process in a case where the degree of deterioration is less than 0.1, overwriting printing is performed without correction of deterioration. The document image data with the degree of deterioration of less than 0.1 is, for example, image data 1210 in FIG. 8I that is an image data of an image, on which the original image data 1203 is printed, read by the document reading unit 100. When the specific number of pixels is 25 with 5 pixels in the main scan direction and 5 pixels in the sub scan direction, there is only one deteriorated pixel that is a white spot pixel in the image data 1210, thus 1/25=0.04, and the degree of deterioration is less than 0.1. In S1506, the pattern matching unit 8603 outputs a signal instructing not to correct deterioration via the CPU 801, the external IF 805, and the external IF 852 to the host computer 850. When the host computer 850 detects the signal instructing not to correct deterioration, the host computer 850 prepares overwriting image data only constituted by the original overwriting image data 1207 in FIG. 8F without adding correction image data. Then, in S1505, overwriting printing is performed to overwrite the document G with the original overwriting image data 1207.

In S1507, a process in a case where the degree of deterioration is 0.5 or more is performed. The document image data with the degree of deterioration of 0.5 or more is, for example, image data 1211 in FIG. 8J that is document image data of an image, on which the original image data 1203 is printed, read by the document reading unit 100. When the specific number of pixels is 25 with 5 pixels in the main scan direction and 5 pixels in the sub scan direction, there are 13 deteriorated pixels that are white spot pixels in the image data 1211, thus 13/25=0.52, and the degree of deterioration is 0.5 or more. In S1507, the pattern matching unit 8603 uses original image data as correction image data, and thus a replacement instruction unit 8606 outputs an original image data replacement signal. The host computer 850 that has received the original image data replacement signal via the CPU 801, the external IF 805, and the external IF 852 prepares overwriting image data with original image data being added. The host computer 850 reads the original image data 1203 stored in the external storage apparatus 855 as correction image data, adds the original image data 1203 to the original overwriting image data 1207, and prepares the overwriting image data. Then, the host computer 850 notifies the pattern matching unit 8603 of completion of preparation of the overwriting image data. Then, in S1505, overwriting printing is performed to overwrite the document G with overwriting image data. In this embodiment, thresholds of the degree of deterioration are 0.1 and 0.5 for description, but the degree of deterioration may be set to any threshold, for example, depending on accuracy of an image to be output.

As described above, according to this embodiment, even if an image to be read is deteriorated, an overwritten final print easy to recognize can be printed. The deteriorated image can be corrected by an easy method, thereby obtaining an image with high quality with deterioration of the read document being corrected. In this embodiment, the host computer generates the correction image data to correct the deteriorated pixel, and prepares the overwriting image data to overwrite the document. For example, the CPU of the image forming apparatus may generate the correction image data or prepare the overwriting image data, or the deterioration detection unit may generate the correction image data and the CPU of the image forming apparatus may prepare the overwriting image data.

Embodiment 2

Figure 9A:
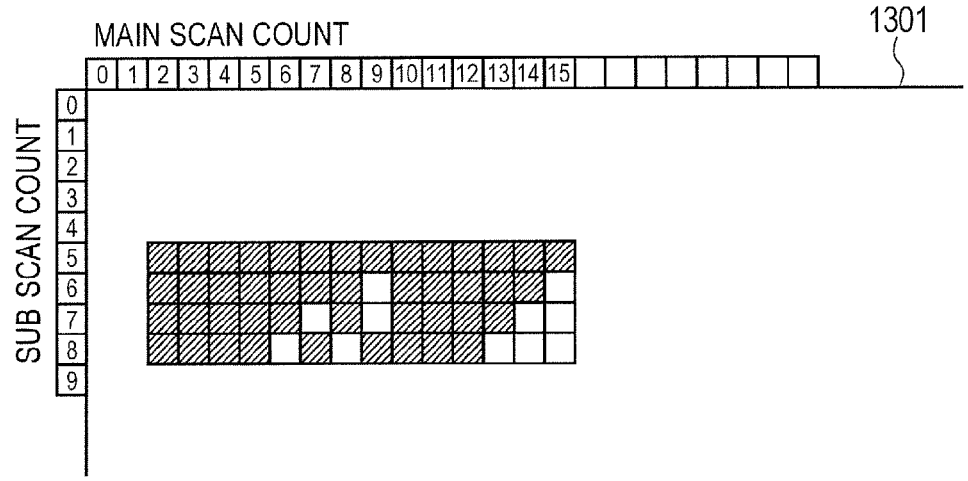
FIGS. 9A and 9B illustrate image deterioration detection and correction in Embodiment 2.
Figure 9B:
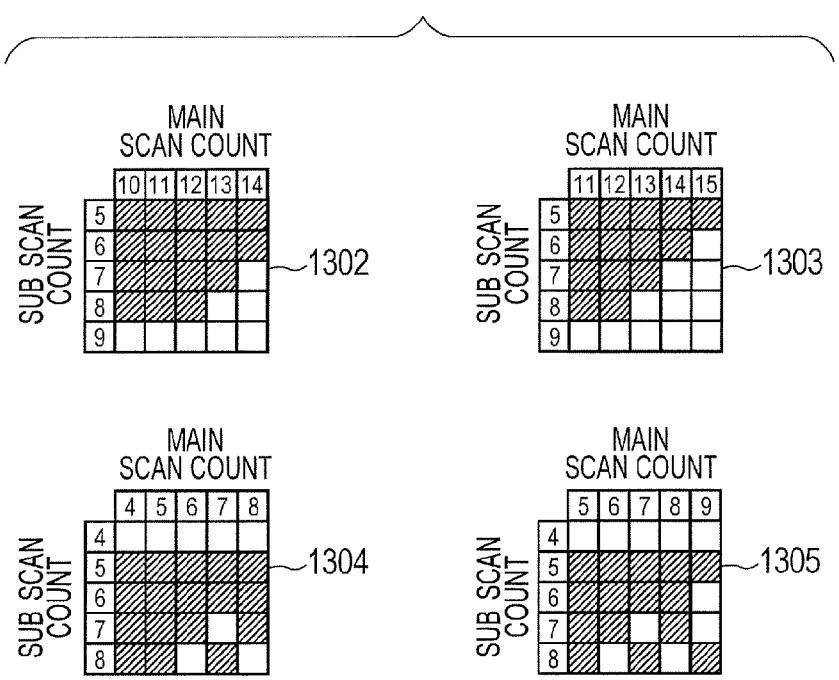
Figure 9C:
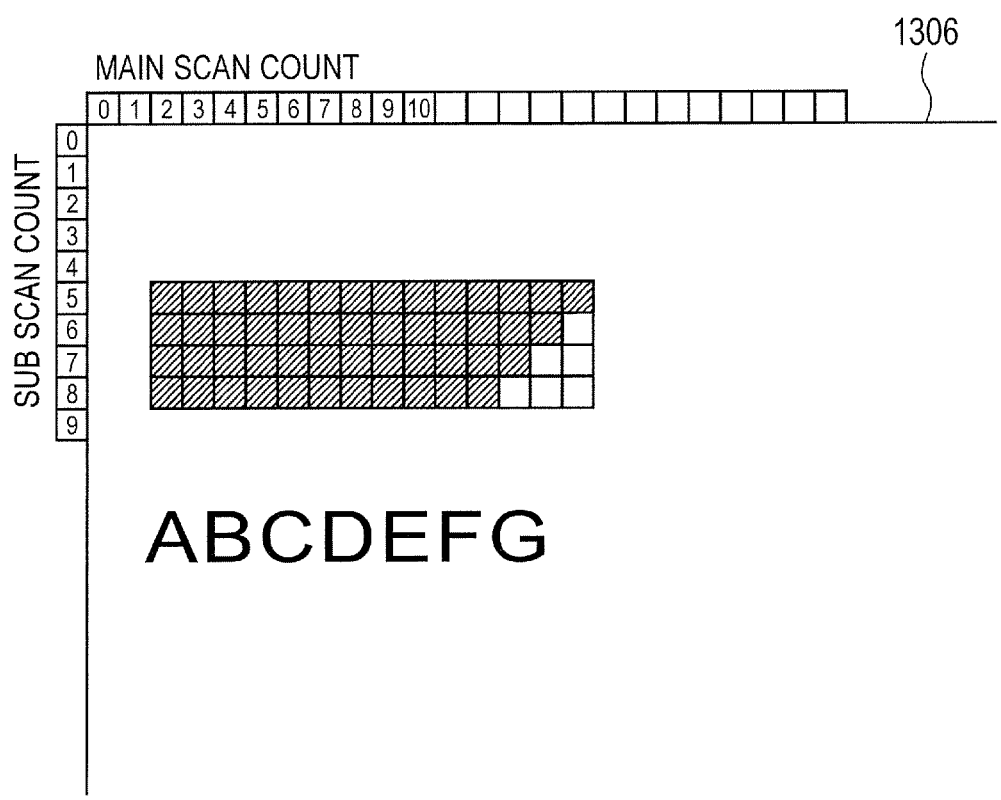
FIG. 9C illustrates image deterioration detection and correction in Embodiment 2.
Figure 10:
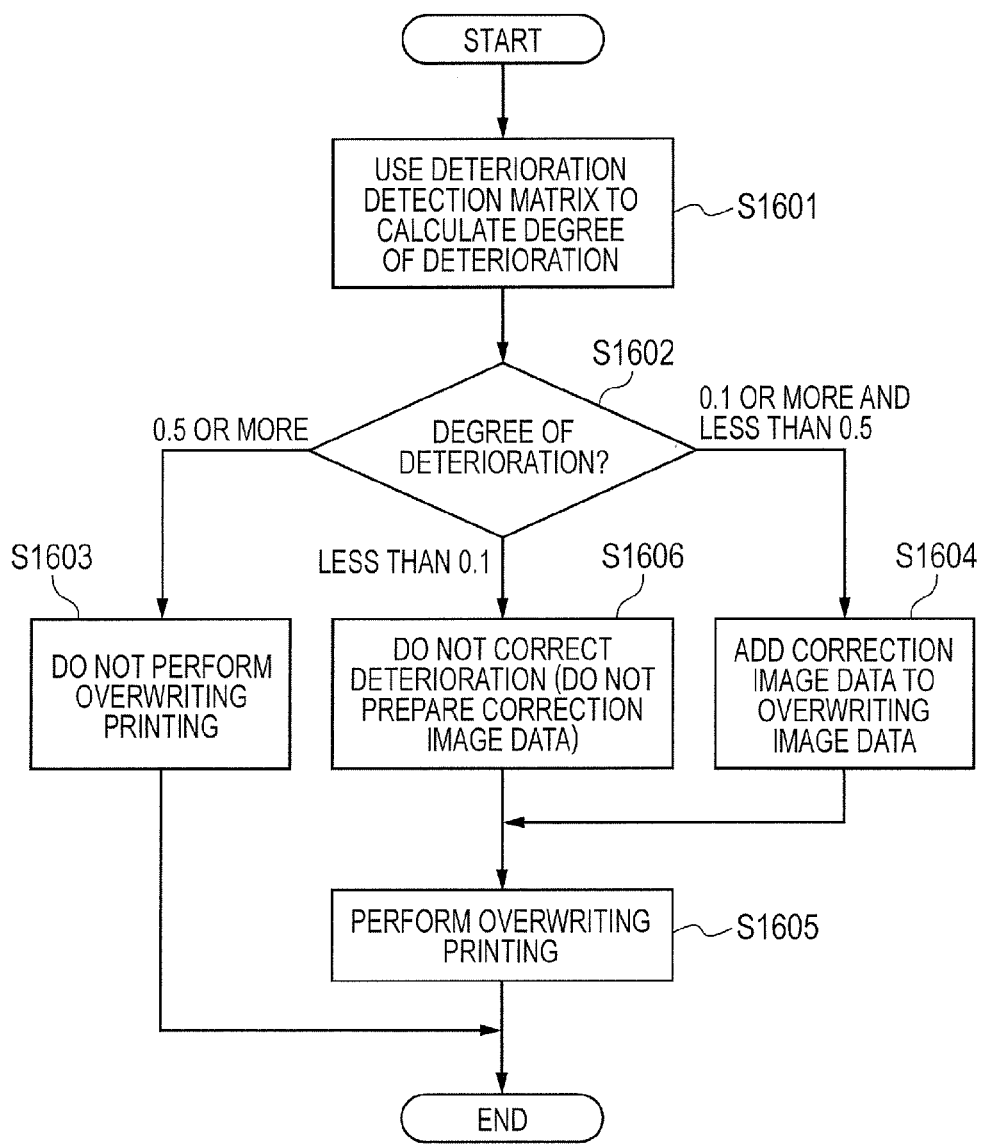
FIG. 10 is a flowchart of process sequences of detection and correction of deterioration of read document image data in Embodiment 2.

In this embodiment, with reference to FIGS. 9A, 9B, 9C and 10, a process will be described in the case where no storage mark is detected in the read document image data in Embodiment 1 (process in S1508 in FIG. 7). FIGS. 9A, 9B and 9C illustrate image data used in the description of this embodiment. FIG. 10 is a flowchart of a process sequence of detecting and correcting image quality deterioration in the case where no storage mark is detected in the document image data. A configuration and a function of a deterioration detection unit 860 in this embodiment are the same as in Embodiment 1, and descriptions thereof will be omitted.

Process Sequence of Deterioration Correction of Document Image Data

In S1601 in FIG. 10, a pattern matching unit 8603 uses a deterioration detection matrix to detect a pixel with deteriorated image quality, and calculate a degree of deterioration depending on the number of deteriorated pixels in unit pixels (also in this embodiment, 5×5 pixels) by the same procedure as in Embodiment 1.

In this embodiment, a storage mark 1202 indicating a storage location of an original image cannot be detected from document image data, and original image data cannot be obtained. This prevents a comparison with original image data 1201 in FIG. 8A for each pixel as in Embodiment 1, and thus a deterioration detection matrix (hereinafter referred to as "matrix") is used to detect a pixel with deteriorated image quality.

Image data 1301 in FIG. 9A is document image data of a printed image read by a document reading unit 100. For the image data 1301, a matrix of 25 pixels with 5 pixels in a main scan direction and 5 pixels in a sub scan direction is used to detect a pixel with deteriorated image quality. The deteriorated pixel is detected by detecting white spot pixel data without regularity.

White spot pixel data "with regularity" will be described using image data 1302 and 1303 in FIG. 9B. When a matrix is located in a position with main scan count values of 10 to 14 and sub scan count values of 5 to 9 in the image data 1302 in FIG. 9B, white spot pixels are detected in positions with a sub scan count value of 8 and main scan count values of 13 and 14. A white spot pixel is also detected in a position with a sub scan count value of 7 and a main scan count value of 14. In the image data 1303 in FIG. 9B, when a matrix is located in a position with main scan count values of 11 to 15 and sub scan count values of 5 to 9, white spot pixels are detected in positions with a sub scan count value of 8 and main scan count values of 13, 14 and 15. White spot pixels are detected in positions with a sub scan count value of 7 and main scan count values of 14 and 15, and a position with a sub scan count value of 6 and a main scan count value of 15. Specifically, the white spot pixel is incremented by one in positions with sub scan count values of 6, 7 and 8 and a main scan count value incremented by one. As such, when a white spot image increases with regularity, it is not determined that the pixel is a pixel with deteriorated image quality.

Next, white spot pixel data "without regularity" will be described using image data 1304 and 1305 in FIG. 9B. When a matrix is located in a position with main scan count values of 4 to 8 and sub scan count values of 4 to 8 in the image data 1304 in FIG. 9B, white spot pixels are detected in a position with a sub scan count value of 7 and a main scan count values of 7 and positions with a sub scan count value of 8 and main scan count values of 6 and 8. Image data 1305 in FIG. 9B is image data when a count value is incremented by one in a main scan direction from the image data 1304 in FIG. 9B, and a white spot pixel is generated in a position with a sub scan count value of 6 and a main scan count value of 9. A white spot image is generated in a position with a sub scan count value of 7 and a main scan count value of 9, and no white spot pixel is generated in a position with a sub scan count value of 8. In this case, white and black pixels are alternately located, and there is no continuity in an increase in the white or black pixels, and thus it is determined that the white spot image is a deteriorated image. Specifically, it can be determined that a pixel with a sub scan count value of 6 and a main scan count value of 9, pixels with a sub scan count value of 7 and main scan count values of 7 and 9, and pixels with a sub scan count value of 8 and scan count values of 6 and 8 are deteriorated white spot pixels.

In S1601, the pattern matching unit 8603 detects all deteriorated pixels, and then calculates a degree of deterioration by the same method as in Embodiment 1.

Then in S1602, the pattern matching unit 8603 determines the calculated degree of deterioration, and proceeds to S1606 when the degree of deterioration is less than 0.1, proceeds to S1604 when the degree of deterioration is 0.1 or more and less than 0.5, and proceeds to S1603 when the degree of deterioration is 0.5 or more. S1604, 1605 and S1606 in FIG. 10 are substantially the same as S1504, S1505, S1506 in FIG. 7 in Embodiment 1, and thus descriptions thereof will be omitted. In S1603 that is a process in the case where the degree of deterioration is 0.5 or more, overwriting printing on the document G is not performed. Thus, the document G having stopped while being nipped by the conveyance roller 42 in FIG. 5A or the conveyance roller 43 in FIG. 5B for overwriting printing is released from stop, and the document G is conveyed to a paper discharge roller 60 without image formation, and stacked on a first paper discharge unit 70.

In the host computer 850, correction image data that corrects a deteriorated pixel is generated by estimation from pixels around the deteriorated pixel. For example, a white spot pixel in the image data 1305 in FIG. 9B is surrounded by black pixels based on the document image data 1301. Thus, the white spot pixel is corrected by the black pixels, thereby obtaining an overwriting image with high image quality as image data 1306 in FIG. 9C. In this embodiment, thresholds of the degree of deterioration are 0.1 and 0.5 for description, but the degree of deterioration may be set to any threshold, for example, depending on accuracy of an image desired to be output.

As described above, according to this embodiment, even if an image to be read is deteriorated, an overwritten final print easy to recognize can be printed. Even when a storage mark indicating a storage location of original image data is not detected, a deteriorated image can be corrected based on the read document image data, thereby obtaining an image with high quality with deterioration of a read document being corrected.

Embodiment 3

In this embodiment, a process of correcting deterioration of an overwriting printing image will be described in a case where image quality of the overwriting printing image subjected to overwriting printing on a document is deteriorated.

Figure 11:
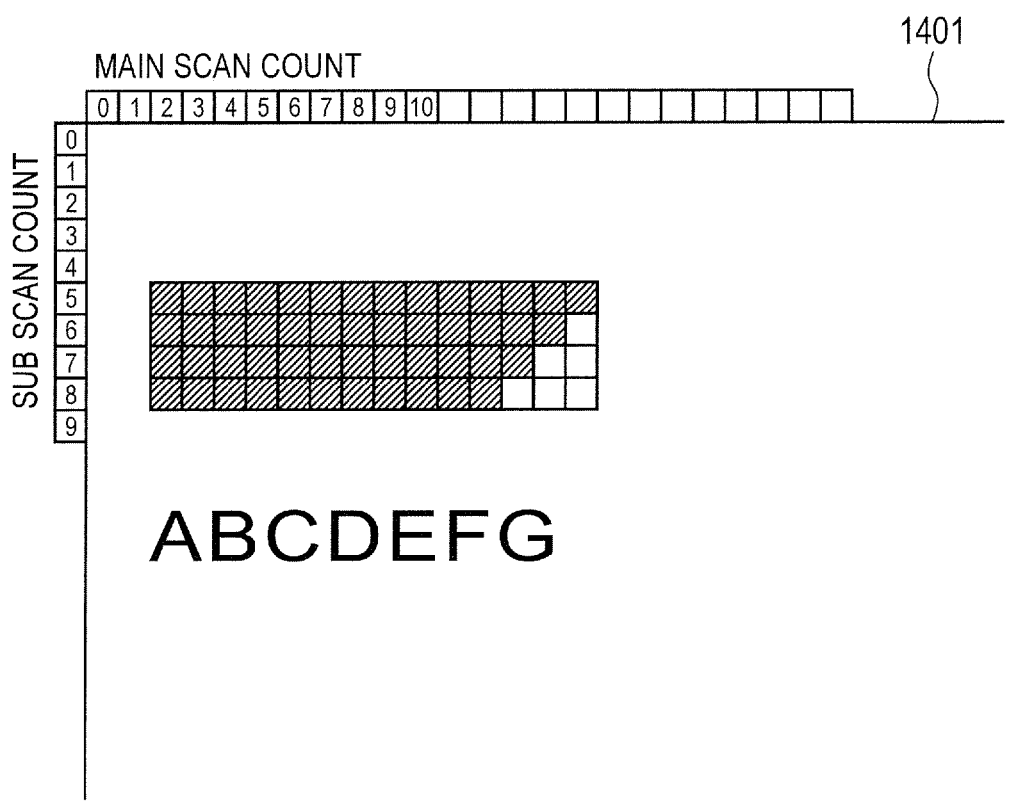
FIG. 11 illustrates image data when overwriting printing is performed in Embodiment 3.

Image data 1401 in FIG. 11 is document image data subjected to overwriting printing on a document in Embodiment 1 or 2, and illustrates that a white spot pixel is generated in a part of a letter G and quality of an overwriting image is deteriorated.

Deterioration of image quality is detected by the procedure described in Embodiment 1 or 2 of again reading an image on a document subjected to overwriting printing with a document reading unit 100. For example, in Embodiment 1, overwriting image data stored in an external storage apparatus 855 of a host computer 850 is used as original image data. A method for correcting a deteriorated pixel described in Embodiment 1 or 2 is used.

As described above, according to this embodiment, even if an image to be read is deteriorated, an overwritten final print easy to recognize can be printed. Deterioration in a position of overwriting printing can be corrected, thereby obtaining a document image and an overwriting image with high quality.

In the above embodiment, the descriptions are based on the configuration of the image forming apparatus that forms black and white images, but the present invention may be applied to a color image forming apparatus. The present invention may be applied to a color image forming apparatus of such a type that photosensitive drums as image bearing members for forming yellow, magenta, cyan, and black images are arranged in parallel, and an image is transferred from each photosensitive drum to a recording material or an intermediate transfer member. Also, the present invention may be applied to a color image forming apparatus of such a type that images of respective colors are successively formed on one image bearing member (photosensitive drum), and a color image is formed on an intermediate transfer member and transferred to a recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106112, filed May 7, 2012, which is hereby incorporated by reference herein in its entirety.

What is claimed is:

1. An image forming apparatus comprising:
   a reading unit provided in the image forming apparatus, and configured to read a document image on a document conveyed in the image forming apparatus;
   a detection unit configured to detect deterioration of document image data of the document image read by the reading unit;
   a first image generation unit configured to generate correction image data for correcting a pixel in the document image the deterioration of whose document image data is detected by the detection unit;
   a second image generation unit configured to generate overwriting image data used for overwriting the document image read by the reading unit with a corresponding overwriting image;
   an image forming unit configured to form the overwriting image on the document on which the document image has been formed; and
   a control unit configured to control the image forming unit so as to form the overwriting image on the document with image data obtained by adding the correction image data to the overwriting image data.

2. The image forming apparatus according to claim 1, further comprising an obtaining unit configured to obtain original image data that is an original of the document image, wherein, when the detection unit detects a predetermined image pattern in a predetermined position in the document image data, the obtaining unit obtains the original image data from a storage apparatus storing the original image data indicated by the predetermined image pattern.

3. The image forming apparatus according to claim 2, wherein the detection unit compares the document image data with the original image data to detect a pixel deteriorated in the document image data.

4. The image forming apparatus according to claim 3, wherein the first image generation unit does not generate the correction image data when a degree of deterioration of the document image data, which is calculated from a detection result of the deterioration by the detection unit, is less than a first predetermined value,
   wherein the first image generation unit generates the correction image data by correcting the pixel in which the deterioration is detected by the detection unit based on the original image data when the degree of deterioration is equal to or more than the first predetermined value and less than a second predetermined value, and
   wherein the original image data is used as the correction image data when the degree of deterioration is equal to or more than the second predetermined value.

5. The image forming apparatus according to claim 2, wherein, when the detection unit does not detect the predetermined image pattern in the predetermined position in the document image data, the detection unit detects a pixel deteriorated in the document image data read by the reading unit based on the regularity of image quality with respect to surrounding pixels thereof.

6. The image forming apparatus according to claim 5, wherein the first image generation unit does not generate the correction image data when a degree of deterioration of the document image data, which is calculated from a detection result of the deterioration by the detection unit, is less than a first predetermined value,
   wherein the first image generation unit generates the correction image data by correcting the pixel in which the deterioration is detected by the detection unit based on the document image data when the degree of deterioration is equal to or more than the first predetermined value and less than a second predetermined value, and
   wherein the control unit is configured to control the image forming unit so as not to form the overwriting image when the degree of deterioration is equal to or more the second predetermined value.

7. The image forming apparatus according to claim 1, further comprising:
   a first conveyance path for forming an image by the image forming unit;
   a second conveyance path for reading a first surface of the document by the reading unit; and
   a third conveyance path for reading a second surface of the document by the reading unit,
   wherein the control unit is configured to convey the document from which the document image is read by the reading unit to the first conveyance path, and to cause the image forming unit to form the overwriting image on the document.

8. The image forming apparatus according to claim 7, wherein an upstream portion of the second conveyance path is connected to a downstream portion of the first conveyance path, a downstream portion of the second conveyance path is connected to an upstream portion of the first conveyance path, and
   the third conveyance path is connected to the downstream portion of the second conveyance path.

9. The image forming apparatus according to claim 1, wherein the control unit causes the reading unit to read again the document on which the overwriting image has been formed, and causes the detection unit to detect the deterioration of the overwriting image data.

10. The image forming apparatus according to claim 9, wherein the control unit is configured to cause the first image generation unit to generate correction image data for correcting a pixel in the overwriting image data when the detection result of the detection unit shows deterioration of the overwriting image data.

11. An image forming apparatus comprising:
   an image forming unit configured to form an image;
   a reading unit configured to read a document image on a document and to output document image data;
   a conveyance unit configured to convey the document to the reading unit and to convey the document to the image forming unit after reading of the document image on the document; and
   a control unit configured to detect a difference between original image data corresponding to the document image and the document image data read by the reading unit,
   wherein the control unit generates overwriting image data for correcting the document image data according to the difference, and controls the image forming unit to overwrite an image corresponding to the overwriting image data on the document image on the document which is conveyed to the image forming unit by the conveyance unit.

12. The image forming apparatus according to claim 11, further comprising:
   a first conveyance path on which the image is formed by the image forming unit;
   a second conveyance path on which a first surface of the document is read by the reading unit; and
   a third conveyance path on which a second surface of the document is read by the reading unit,
   wherein the control unit is configured to convey the document from which the document image is read by the reading unit to the first conveyance path, and to cause the image forming unit to form the image on the document.

13. The image forming apparatus according to claim 12, wherein an upstream portion of the second conveyance path is connected to a downstream portion of the first conveyance path, a downstream portion of the second conveyance path is connected to an upstream portion of the first conveyance path, and the third conveyance path is connected to the downstream portion of the second conveyance path.

14. The image forming apparatus according to claim 11, wherein the control unit is configured to compare the document image data of the document image, which is read by the reading unit, with the original image data of the document image which is formed on the document, and
   wherein, when at least a part of the document image data differs from the original image data according to a result of the comparison, the control unit controls the image forming unit so as to form the image on the document image on the document for correcting at least the part of the document image data of the document image based on the original image data.

15. The image forming apparatus according to claim 11, wherein a mark image corresponding to the original image data is formed on the document, and the control unit acquires the original image data from the outside according to a result of the reading of the mark image read by the reading unit.

16. The image forming apparatus according to claim 15, the mark image includes a specific code.

17. The image forming apparatus according to claim 11, further comprising:
   a first conveyance path on which the image is formed on a first surface of a recording material by the image forming unit; and
   a second conveyance path for conveying the recording material after conveying the recording material to the first conveyance path,
   wherein, when the recording material is not conveyed to the first conveyance path, the recording material is conveyed to the second conveyance path so as to read the recording material by the reading unit.

* * * * *